US012300024B2

(12) United States Patent
Torabi

(10) Patent No.: US 12,300,024 B2
(45) Date of Patent: May 13, 2025

(54) ROBUST OPERATING ROOM VIDEO ANONYMIZATION BASED ON ENSEMBLE DEEP LEARNING

(71) Applicant: Verb Surgical Inc., Santa Clara, CA (US)

(72) Inventor: Meysam Torabi, Union City, CA (US)

(73) Assignee: Verb Surgical Inc., Santa Clara, CA (US)

( * ) Notice: Subject to any disclaimer, the term of this patent is extended or adjusted under 35 U.S.C. 154(b) by 600 days.

(21) Appl. No.: 17/565,219

(22) Filed: Dec. 29, 2021

(65) Prior Publication Data

US 2023/0206684 A1    Jun. 29, 2023

(51) Int. Cl.
*G06V 40/16* (2022.01)
*G06F 21/62* (2013.01)
*G06N 20/20* (2019.01)

(52) U.S. Cl.
CPC ........ *G06V 40/166* (2022.01); *G06F 21/6254* (2013.01); *G06N 20/20* (2019.01); *G06V 40/172* (2022.01)

(58) Field of Classification Search
CPC .. G06V 40/166; G06V 40/172; G06V 40/161; G06V 40/167; G06V 10/809; G06V 10/82; G06V 20/52; G06F 21/6254; G06N 20/20; G06N 3/045
See application file for complete search history.

(56) References Cited

U.S. PATENT DOCUMENTS

| | | | | |
|---|---|---|---|---|
| 9,355,273 B2 * | 5/2016 | Stevens | ................ | G06F 21/6254 |
| 10,984,225 B1 * | 4/2021 | Ghosh | ................. | G06V 40/161 |
| 11,776,680 B2 * | 10/2023 | Simhadri | ........... | G06V 10/7715 |
| 2016/0224805 A1 * | 8/2016 | Patti | ...................... | G16H 30/40 |
| 2020/0285771 A1 * | 9/2020 | Dey | .................... | G06F 21/6272 |
| 2021/0312595 A1 * | 10/2021 | Simhadri | ............... | G16H 50/70 |
| 2023/0252627 A1 * | 8/2023 | Khirman | ................ | G06V 40/16 |
| | | | | 382/128 |

(Continued)

OTHER PUBLICATIONS

Issenhuth et al. Face detection in the operating room: comparison of state-of-the-art methods and a self-supervised approach, IEEE (Year: 2019).*

(Continued)

*Primary Examiner* — John B Strege
(74) *Attorney, Agent, or Firm* — Aikin & Gallant, LLP

(57) ABSTRACT

Disclosed are various face-detection and human de-identification systems and techniques based on deep learning. In one aspect, a process for de-identifying people captured in an operating room (OR) video is disclosed. This process can begin by receiving a sequence of video frames from an OR video. Next, the process applies a first machine-learning face detector based on a first deep-learning model to each video frame in the sequence of video frames to generate a first set of detected faces. The process further applies a second machine-learning face detector to the sequence of video frames to generate a second set of detected faces, wherein the second machine-learning face detector is constructed based on a second deep-learning model different from the first deep-learning model. The process subsequently de-identifies the received sequence of video frames by blurring out both the first set of detected faces and the second set of detected faces.

16 Claims, 14 Drawing Sheets

(56) References Cited

U.S. PATENT DOCUMENTS

2023/0409749 A1* 12/2023 Li .................. H04N 21/4318
2023/0419503 A1* 12/2023 Rudzicz ............... G06V 40/10
2024/0104960 A1* 3/2024 Manner ............... G06V 20/41

OTHER PUBLICATIONS

Ge et al., Detecting masked faces in the wild with LLE_CNNs. IEEE (Year: 2017).*

Flouty et al., FaceOff: Anonymizing Videos in the Operating Rooms, (Year: 2018).*

* cited by examiner

ROBUST OPERATING ROOM VIDEO ANONYMIZATION BASED ON ENSEMBLE DEEP LEARNING

TECHNICAL FIELD

The disclosed embodiments generally relate to machine-learning-(ML)-based techniques for improving operating room (OR) efficiencies. More specifically, the disclosed embodiments relate to using deep-learning analysis on OR videos to improve OR efficiencies while protecting privacies of the people in the OR videos.

BACKGROUND

Operating room (OR) costs are among one of the highest medical and healthcare-related costs in the US. With sky-rocketing healthcare expenditures, OR-costs management aimed at reducing OR costs and increasing OR efficiency has become an increasingly important research subject. One sure way to improve OR efficiency is by minimizing the transition time between two consecutive surgical procedures using an OR. In other words, once the first patient from the current procedure has left the OR, the staff would bring in the next patient without any delay. Such a seamless OR transition improves the OR efficiency by enabling hospitals to take care of more patients per day. Moreover, the OR costs for the patients are also reduced as a result of the improved OR efficiency.

Nowadays ORs have cameras installed for monitoring OR workflows. OR videos captured by the OR cameras can provide visual feedback from the events taking place during a surgery, and hence analyzing and mining recorded OR videos can lead to improved OR efficiency, which subsequently reduces the costs for both patients and hospitals. However, OR videos need to be de-identified first by removing Personally Identifiable Information (PII), so that the de-identified OR videos can be stored and passed to post-processing services without exposing PII of the patients and OR personnel.

The primary sources of PII in these OR videos are patient's and OR staff's faces. To de-identify captured faces in the OR videos, the faces have to be first detected. The existing face detection techniques are generally constructed using a bottom-up approach that relies on facial features such as the nose and eyes to build up and infer the face locations. However, face features of people's faces in an OR are often heavily covered by Personal Protective Equipments (PPEs) such as face masks, face shields, goggles, and glasses, and can also be occluded by other OR staff and OR equipments, which make the existing face detection techniques ineffective. These OR face detection challenges are exacerbated by off-angle poses of faces, backward-facing faces, small faces with low resolutions, low illuminations, and also in some cases, illuminations that are too strong.

Hence, what is needed is a significantly more robust and effective OR video de-identification technique without the drawbacks of existing techniques.

SUMMARY

Disclosed are various face-detection and human de-identification systems and techniques based on image processing and deep learning. Existing face-detection techniques generally operate on single frames without considering temporal information between frames. The disclosed face-detection and human de-identification systems and techniques are multi-staged that leverage a deep-learning technology designed for detecting tiny faces in crowd environments and further enhance this tiny-face detection technique with a temporal-based face tracker that uses temporal information of older frames to improve the face inference accuracies in the news frames. As a result, the disclosed temporal-based face tracker in the multi-stage designs can be used to detect and remove flickering bounding boxes and re-identify those missing faces unable to be continuously detected by the tiny-face detection technique. The re-identified faces by the temporal-based face tracker can be added to the already detected faces by the tiny-face detection technique to improve the face-detection robustness and reliability of the overall face-detection systems. In further embodiments, the disclosed temporal-based face tracker can be implemented either in a single-pass process in a forward temporal direction or it can be implemented in a two-pass procedure including both a forward pass and a reverse pass. When the two-pass procedure is implemented, the disclosed temporal-based face tracker can process a sequence of temporally-correlated video frames twice: once forward in time and once reverse in time, thereby allows more missing faces to be detected, and the overall detection performance to be significantly improved.

Embodiments of the present face-detection and human de-identification systems further include an aspect that combines multiple different face detection techniques to enable a significantly reduced number of false negatives, thereby resulting in further improved sensitivity of the overall system. Note that in these embodiments, the disclosed face-detection and human de-identification systems leverage the ensemble deep-learning concept by combining different face-detection techniques that are constructed and trained differently. Because these different face-detection techniques have different types of false negatives (i.e., missed faces), the combined face-detection system that combines the face-detection results from the multiple face-detection techniques can have the lowest number of missed faces than each individual face-detection technique. Moreover, this multi-model combined face-detection system allows a wider range of hard-face scenarios to be resolved, thereby creating a stronger and more robust face-detection technology. While the embodiments of the face-detection and human de-identification techniques and systems are described and used for the purpose of anonymizing OR videos and improving OR efficiencies, the disclosed face-detection and human de-identification techniques and systems may be used for an even wider range of applications both in hospital and medical services and non-medical face-detection and PII de-identification applications.

In one aspect, a process for de-identifying people captured in an operating room (OR) video is disclosed. This process can begin by receiving a sequence of video frames from an OR video. Next, the process applies a first machine-learning face detector to each video frame in the sequence of video frames to generate a first processed sequence of video frames, wherein the first processed sequence of video frames includes a first set of detected faces. In some embodiments, the first face detector is configured to use a first deep-learning model to detect faces that are lack of facial features. The process further applies a second machine-learning face detector to each video frame of the sequence of video frames to generate a second processed sequence of video frames, wherein the second processed sequence of video frames includes a second set of detected faces. Note that the second machine-learning face detector is constructed based on a second deep-learning model different from the first deep-learning model. Next, the process combines the first set of detected faces in the first processed sequence of video frames and the second set of detected faces in the second processed sequence of video frames to generate a combined set of detected faces. The process subsequently de-identifies the combined set of detected faces in the sequence of video frames to remove personal identifiable information (PII) from the sequence of video frames.

In some embodiments, the first machine-learning face detector is a top-down face detector configured to use contextual information outside the face of a person and from the body of the person to detect the face of the person.

In some embodiments, the second machine-learning face detector is a hybrid pose-keypoint face detector which is configured to detect the face of a person by: (1) detecting two or more keypoints of the person, wherein each of the two or more keypoints can be either a face keypoint on the face of the person or a body keypoint on the body but outside of the face of the person; (2) determining a location of the face based on the detected two or more keypoints; (3) estimating a size of the face based on a distance between the detected two or more keypoints; and (4) determining a bounding box for the face of the person based on the determined the position and the estimated size of the face of the person.

In some embodiments, the first set of detected faces includes a first set of false negatives from the first processed sequence of video frames while the second set of detected faces includes a second set of false negatives from the second processed sequence of video frames that does not overlap with the first set of false negatives. Hence, the combined set of detected faces includes a fewer number of false negatives than both the first set of detected faces and the second set of detected faces.

In some embodiments, the first machine-learning face detector processes the sequence of video frames frame-by-frame without considering temporal relationships in consecutive frames in the sequence of video frames.

In some embodiments, the first processed sequence of video frames is composed of a first subset of processed video frames, wherein a given video frame in the first subset of processed video frames is followed by a subsequent video frame in the first processed sequence of video frame. Note that the subsequent video frame includes at least the same set of detected faces as the given video frame in the first subset of processed video frames. The first processed sequence of video frames is additionally composed of a second subset of processed video frames, wherein a given video frame in the second subset of processed video frames is preceded by a previous video frame in the first processed sequence of video frames. Note that the previous video frame includes one or more additional detected faces that are not detected in the given video frame in the second subset of processed video frames. These one or more additional detected faces are considered as missing faces in the given video frame in the second subset of processed video frames.

In some embodiments, prior to combining the first set of detected faces and the second set of detected faces, the process further includes the step of processing the first processed sequence of video frames using a third face detector to detect those missing faces in the second subset of processed video frames.

In some embodiments, the process uses the third face detector to process a pair of consecutive video frames in the first processed sequence of video frames based on temporal information that indicates a degree of correlation between the pair of consecutive video frames.

In some embodiments, the process processes the pair of consecutive video frames uses the third face detector by first identifying a face that was detected in the first frame of the pair of consecutive video frames but subsequently missing in the second frame of the pair of consecutive video frames. The process then instantiates an object tracker for the identified missing face. The process subsequently locates the identified missing face in the second frame using the object tracker.

In some embodiments, the process instantiates the object tracker for the identified missing face by first determining if the detected face in the first frame is associated with a sufficiently low confidence level. If so, the process instantiates the object tracker for the identified missing face. Otherwise, the process does no instantiate the object tracker for the identified missing face.

In some embodiments, the process identifies the missing face in the second frame of the pair of consecutive video frames by: (1) computing a set of Intersection of Union (IoU) values for pairs of bounding boxes formed between each detected bounding box in the first frame and each bounding box in the second frame; and (2) identifying a missing face in the second frame when all of the computed IoU values in the set of IoU values that are based on the same detected bounding box in the first frame are closed to zero.

In some embodiments, the object tracker is implemented with a Channel and Spatial Reliability correlation Tracker (CSRT).

In some embodiments, for each video frame in the received sequence of video frames, the process further counts a number of detected faces in the video frame based on the combined set of detected faces. The process then determines the number of people in the OR at any given time during a surgical procedure based on the number of detected faces in a given video frame in the sequence of video frames.

In some embodiments, the process keeps track of a rate of change of the number of people in the OR based on the determined numbers of people during the surgical procedure.

In some embodiments, the process determines a precise time when the current patient leaves the OR based on the determined numbers of people in the OR during the surgical procedure.

In another aspect, a process for de-identifying people captured in an OR video is disclosed. This process can begin by receiving a sequence of video frames from an OR video. Next, the process applies a face detector to the sequence of video frames to generate a processed sequence of video frames that includes a first set of detected faces, wherein the face detector is configured to use a top-down face-detection model to detect faces that are lack of facial features. The process further processes the processed sequence of video frames in a pair-wise manner to detect a set of missing faces in the processed sequence of video frames. This detection of missing faces includes the steps of: (1) receiving a pair of consecutive video frames in the processed sequence of video frames; (2) identifying a face that was detected in the first frame of the pair of consecutive video frames but subsequently missing in the second frame of the pair of consecutive video frames; and (3) searching the identified missing face in the second frame based on temporal information that indicates a degree of correlation between the pair of consecutive video frames. The process subsequently de-identifies the first set of detected faces and the detected set of missing faces in the received sequence of video frames to remove personal identifiable information (PII) from the received sequence of video frames.

In some embodiments, the process identifies the missing face in the second frame of the pair of consecutive video frames by first computing a set of Intersection of Union (IoU) values for pairs of bounding boxes formed between each detected bounding box in the first frame and each bounding box in the second frame. The process subsequently identifies a missing face in the second frame if all of the computed IoU values in the set of IoU values that are based on the same detected bounding box in the first frame are closed to zero.

BRIEF DESCRIPTION OF THE DRAWINGS

The structure and operation of the present disclosure will be understood from a review of the following detailed description and the accompanying drawings in which like reference numerals refer to like parts and in which.

DETAILED DESCRIPTION

Figure 1:
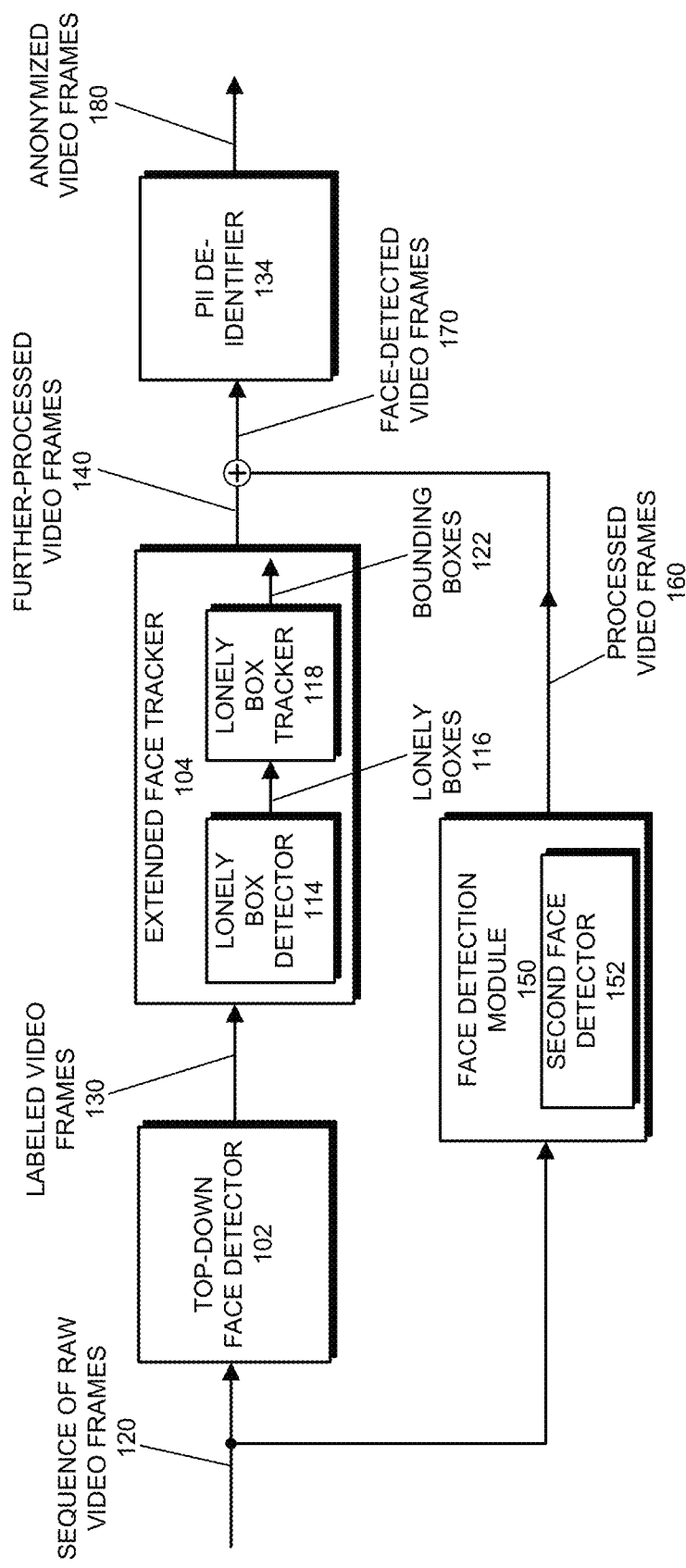
FIG. 1 illustrates a block diagram of a disclosed operating room (OR) de-identification system for anonymizing OR videos in accordance with some embodiments described herein.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Disclosed are various face-detection and human de-identification systems and techniques based on image processing and deep learning. Existing face-detection techniques generally operate on single frames without considering temporal information between frames. The disclosed face-detection and human de-identification systems and techniques are multi-staged that leverage a deep-learning technology designed for detecting tiny faces in crowd environments and further enhance this tiny-face detection technique with a temporal-based face tracker that uses temporal information of older frames to improve the face inference accuracies in the news frames. As a result, the disclosed temporal-based face tracker in the multi-stage designs can be used to detect and remove flickering bounding boxes and re-identify those missing faces unable to be continuously detected by the tiny-face detection technique. The re-identified faces by the temporal-based face tracker can be added to the already detected faces by the tiny-face detection technique to improve the face-detection robustness and reliability of the overall face-detection systems. In further embodiments, the disclosed temporal-based face tracker can be implemented either in a single-pass process in a forward temporal direction or it can be implemented in a two-pass procedure including both a forward pass and a reverse pass. When the two-pass procedure is implemented, the disclosed temporal-based face tracker can process a sequence of temporally-correlated video frames twice: once forward in time and once reverse in time, thereby allows more missing faces to be re-detected, and the overall detection performance to be significantly improved.

Embodiments of the present face-detection and human de-identification systems further include an aspect that combines multiple different face detection techniques to enable a significantly reduced number of false negatives, thereby resulting in further improved sensitivity of the overall system. Note that in these embodiments, the disclosed face-detection and human de-identification systems leverage the ensemble deep-learning concept by combining different face-detection techniques that are constructed and trained differently. Because these different face-detection techniques have different types of false negatives (i.e., missed faces), the combined face-detection system that combines the face-detection results from the multiple face-detection techniques can have the lowest number of missed faces than each individual face-detection technique. Moreover, this multi-model combined face-detection system allows a wider range of hard-face scenarios to be resolved, thereby creating a stronger and more robust face-detection technology. While the embodiments of the face-detection and human de-identification techniques and systems are generally described and used for the purpose of anonymizing operating room (OR) videos and improving OR efficiencies, the disclosed face-detection and human de-identification techniques and systems may be used for an even wider range of applications both in hospital and medical services and non-medical face-detection and PII de-identification applications.

FIG. 1 illustrates a block diagram of a disclosed OR de-identification system 100 for anonymizing OR videos in accordance with some embodiments described herein. As can be seen in FIG. 1, OR de-identification system 100 includes a top-down face detector 102 that is configured to use contextual information from the rest of the body of a person to detect the face of the person. As described in the background section, detecting human faces in an OR environment is challenging because human facial features are heavily covered by personal protective equipments (PPEs) such as face masks, face shields, goggles, and glasses, and are often occluded by other OR staff and equipment, in addition to off-angle and backward face poses, small faces with low resolutions, very low and too-strong illuminations. Top-down face detector 102 can mitigate these face-detection challenges by using contextual information from the rest of the body of a person to detect the face of the person.

Note that the choice of using top-down face detector 102 in the disclosed OR de-identification system 100 is motivated by how human's vision works. That is, while the faces may be occluded in an image, humans can still detect and locate the faces in the image based on the visual perceptions of other parts of the human body, such as shoulders and chest. This ability is due to the fact that human's vision system understands contextual reasoning. In one embodiment, top-down face detector 102 can be implemented with Single Stage Headless Face Detector (SSH), which was designed to localize small faces in hard images (e.g., images of crowds) based on the contextual information outside the faces. However, other embodiments of top-down face detector 102 can implement other types of existing face detectors that use a top-down face-detection approach by collecting contextual information from the other parts of the body (other than the face) of a person to detect the face of the person.

Note that the deep-learning model built into top-down face detector 102 is typically trained through a training process designed such that the receptive fields of convolutional neural networks (CNNs) in the model can collect contextual information from the rest of the body. Using such a trained deep-learning model, top-down face detector 102 can not only perform robust face detection in cluttered environments, but can help reject false positives by inspecting the areas surrounding an inferred bounding box of a human face. In other words, even though the inferred bounding boxes by top-down face detector 102 are placed around the detected faces, the corresponding receptive fields for the detected faces are significantly larger. Note that the contextual-based approach employed by top-down face detector 102 is a highly logical choice for the targeted OR environment, because the facial features of tiny or hard faces generally disappear quickly toward the deeper layers of CNNs, while the larger receptive field is able to carry the contextual information including the body toward the decision layer of the CNNs, such as a softmax layer.

As can be seen in FIG. 1, top-down face detector 102 receives a sequence of recorded OR video frames 120 (or "sequence of video frames 120") as input. Note that the sequence of video frames 120 can be a portion of or the entire recorded OR video by an OR camera. Top-down face detector 102 subsequently performs the above-described top-down face detection operation on the sequence of video frames 120, frame by frame, and outputs a sequence of face-detected/labeled video frames 130. In each processed frame of the sequence of video frames 130, hard faces, such as tiny faces, partial faces, backward-facing faces, and faces heavily covered by PPEs that would normally be missed by bottom-up face detection techniques can be detected and labeled with corresponding face bounding boxes (or simply "bounding boxes").

However, top-down face detector 102 processes the received video frames on a per-frame basis without taking into account the temporal relationships in consecutive frames in the sequence of video frames 120. Hence, in the sequence of labeled video frames 130, flickering bounding boxes often exist. This means that the bounding boxes of a detected face through the sequence of labeled video frames 130 can disappear (i.e., "missing" or "off") for a number of frames and then reappear ("detected" or "on" again) after the same face is re-detected in subsequent frames. These missing bounding boxes may be caused by small changes in pixel locations and/or pixel values between consecutive frames of the detected face caused by a number of factors, such as changes in face pose/angle, face location, illumination, and temporary occlusion, among others. The instability of the bounding boxes for a detected face through a sequence of frames is commonly referred to as the bounding box "flickering" effect. For the intended purpose of de-identifying the recorded video images of the patient and personnel in the OR by an OR camera, the existence of flickering/missing bounding boxes in the sequence of labeled video frames 130 means that some of the faces in certain frames are not detected and labeled by top-down face detector 102, and therefore would be unable to be anonymized/blurred by a subsequent de-identification process.

Figure 2:
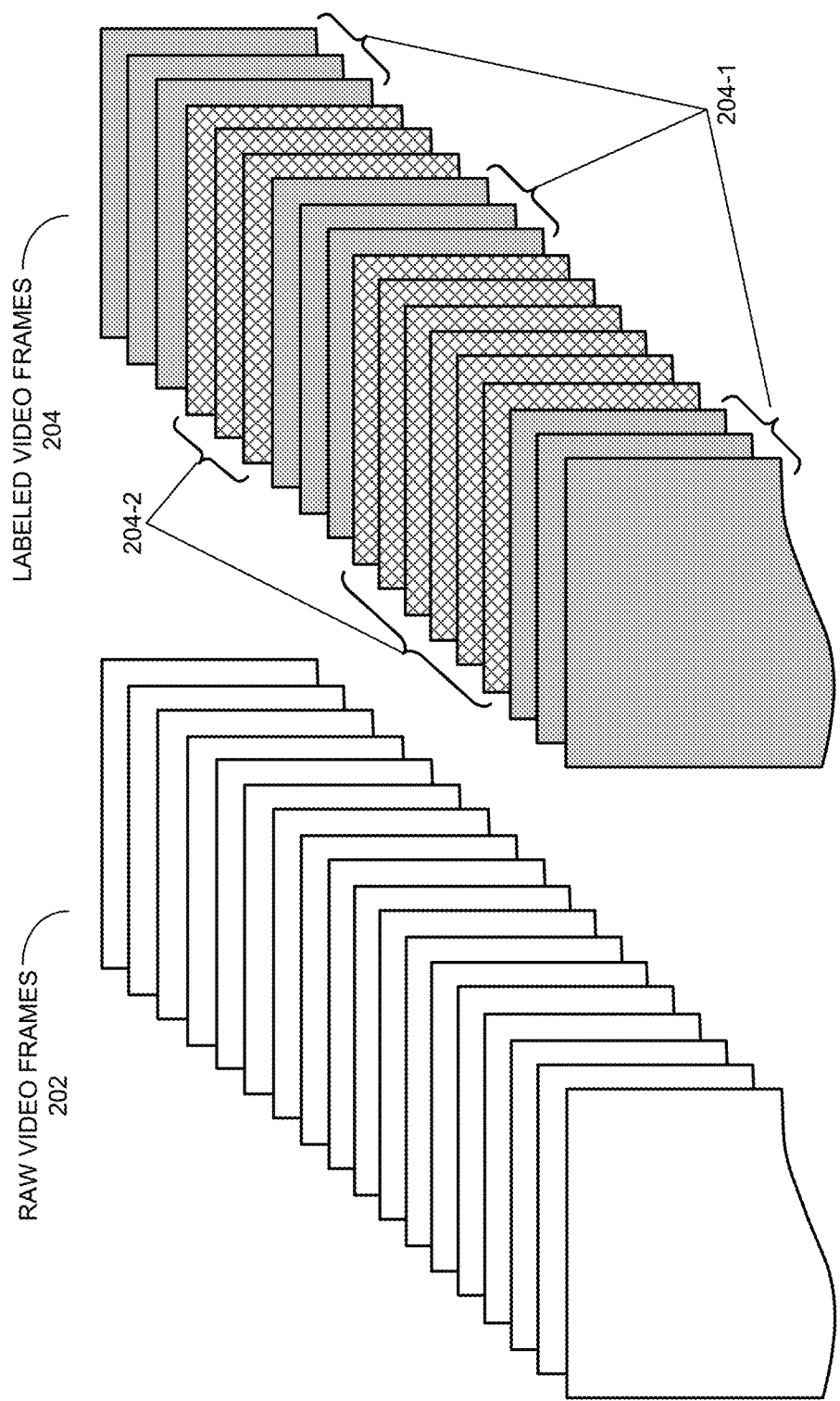
FIG. 2 illustrates an exemplary process of applying the top-down face detector of the disclosed OR de-identification system to a sequence of raw video frames in an OR video in accordance with some embodiments described herein.

FIG. 2 illustrates an exemplary process of applying top-down face detector 102 of the disclosed OR de-identification system to a sequence of raw video frames 202 in an OR video in accordance with some embodiments described herein. Specifically, the sequence of raw video frames 202 is shown on the left of FIG. 2, and all frames are shown in solid white color to indicate they are unprocessed video frames directly from a recorded video. Note that the sequence of raw video frames 202 can be that of or a portion of the sequence of video frames 120. After applying top-down face detector 102 on the sequence of raw video frames 202, an exemplary sequence of labeled video frames 204 is obtained and shown on the right of FIG. 2.

As can be seen in FIG. 2, the exemplary sequence of labeled/processed video frames 204 can include two types of frames: fully-labeled frames 204-1 that do not include the above-described flickering/missing bounding boxes are represented with solid gray color; and incompletely-labeled frames 204-2 that include the above-described flickering/missing bounding boxes are represented with crosshatches. Note that the particular configuration of the fully-labeled frames and incompletely-labeled frames in the sequence of labeled video frames 204 is only used for the illustration purposes. For example, other exemplary outputs of top-down face detector 102 after processing raw video frames 202 can contain a larger or smaller number of incompletely-labeled frames than the example shown in FIG. 2. However, it should be clear that those faces in the incompletely-labeled frames 204-2 that fail to be detected/labeled by top-down face detector 102 cannot be anonymized/blurred by a subsequent de-identification process.

Temporal-Based Face Tracking

To improve the face detection results of top-down face detector 102 and to re-detect those missing faces/bounding boxes in the sequence of labeled video frames 130, the disclosed OR de-identification system 100 also includes a second face detection stage following top-down face detector 102, referred to as an extended face tracker 104 that further processes the sequence of labeled video frames 130. Generally speaking, extended face tracker 104 is designed to use temporal information that indicates a degree of correlation between a pair of consecutive video frames. Note that this temporal information is ignored by top-down face detector 102. More specifically, extended face tracker 104 includes tracking functionalities that utilize information collected from one or more prior video frames of a given face to improve the inference/detection of the given face in the next/subsequent video frames. In doing so, extended face tracker 104 is able to detect each disappeared/missing face of a detected person in one or more frames within the sequence of labeled video frames 130 following a few earlier frames that include the successfully labeled face of the same person. As a result, extended face tracker 104 is configured to detect and add those missing bounding boxes for the detected person in the one or more frames, and thereby removing the flickering effect in these one or more frames. Extended face tracker 104 outputs a sequence of further-processed video frames 140 that does not include flickering bounding boxes, thereby significantly improving the robustness of the overall OR de-identification system 100.

In some embodiments, extended face tracker 104 is configured to process the sequence of labeled video frames 130 in a pair-wise manner by using two sub-modules: a lonely box detector 114 followed by a lonely box tracker 118. In various embodiments, lonely box detector 114 is configured to receive a given pair of consecutive frames (i.e., a first frame followed by a second frame) among the sequence of labeled video frames 130, and detect each flickering bounding box in the second frame, i.e., when a bounding box of a detected face in the first frame disappears in the second frame. In some embodiments, lonely box detector 114 detects each flickering bounding box in the second frame by comparing all the bounding boxes in the pair of consecutive frames. More specifically, for the given pair of consecutive video frames, lonely box detector 114 operates to compute the Intersection of Union (IoU) for each and every pair of bounding boxes from the pair of frames that is composed of the first bounding box from the first frame and the second bounding box from the second frame. In other words, for each bounding box $BB_i$ detected in the first frame, a set of IoU values is computed between $BB_i$ and each bounding box in the second frame; and also for each bounding box $BB_j$ detected in the second frame, a set of IoU values is computed between $BB_j$ and each bounding box in the first frame.

Next, for each bounding box $BB_i$ in the first frame, lonely box detector 114 determines if at least one computed IoU value for bounding box $BB_i$ is non-zero (e.g., if at least one computed IoU value is greater than some predetermined minimum value). If so, the bounding box $BB_i$ in the first frame is considered re-detected in the second frame and therefore not flickering. However, for each bounding box $BB_i$ in the first frame, if all computed IoU values between bounding box $BB_i$ and all the bounding boxes in the second frame are closed to zero (e.g., if no computed IoU value is greater than the predetermined minimum value), lonely box detector 114 determines that the bounding box $BB_i$ in the first frame is absent and missing (i.e., flickering) in the second frame. When the bounding box BB in the first frame is determined to be a flickering bounding box, it does not have a corresponding bounding box in the second frame, and as such can be referred to as a "lonely" bounding box, or simply a "lonely box." Hence, lonely box detector 114 processes input video frames in a pair-wise manner using the above-described IoU-based technique, and identifies and outputs all the flickering or lonely bounding boxes 116 identified in the first frame of the given pair of consecutive video frames.

Lonely box tracker 118 in extended face tracker 104 is configured to receive the identified lonely boxes 116 as inputs and instantiates an object tracking process for each of the identified lonely boxes 116. Each of the instantiated object tracking processes for a given lonely box 116 is subsequently run within the second frame of the given pair of frames to search and locate the missing bounding box in the second frame corresponding to the given lonely box 116 in the first frame. Note that when multiple lonely boxes 116 are identified by lonely box detector 114, lonely box tracker 118 instantiates multiple independent object tracking processes for the multiple lonely boxes 116, wherein the multiple independent object tracking processes can run in parallel within the second frame to search and locate each of the missing bounding boxes in the second frame corresponding to the multiple identified lonely boxes 116.

In various embodiments, lonely box tracker 118 is configured to initiate a tracking box at the same location in the second frame as the identified lonely box in the first frame (i.e., same in terms of the X-Y coordinates because all frames have the same dimensions). It is reasonable to assume that the undetected face of the person in the second frame corresponding to the lonely box in the first frame has not moved significantly relative to the first frame. Lonely box tracker 118 subsequently searches an area at and around the initial location of the tracking box looking for the closest and most similar bounding box to the identified lonely box in the second frame. If successful, lonely box tracker 118 outputs detected bounding boxes 122 of the faces in the second frame missed by top-down face detector 102 corresponding to the identified lonely boxes 116 in the first frame. Note that by limiting the missing bounding box search around the location of the identified lonely box 116 instead of within the entire second frame can significantly speed up the missing-bounding-box detection process.

In some embodiments, lonely box tracker 118 can be implemented with a Channel and Spatial Reliability correlation Tracker (CSRT) which is configured to search a region of interest (ROI) in the second frame using a correlation filter trained on compressed features of the identified lonely box 116. In some embodiments, the compressed features extracted from the identified lonely box can include Histogram of oriented Gradients (HoG). However, the correlation filter in the CSRT can be trained based on other type of extracted features from the identified lonely box 116. Note that lonely box tracker 118 may be implemented with other types of known object trackers other than the CSRT without departing from the scope of the present disclosure.

Note that lonely box detector 114 and lonely box tracker 118 operate collectively on a given pair of consecutive frames in the sequence of labeled video frames 130 to re-detect one or more missing faces/bounding boxes (if such missing bounding boxes are identified) in the second frame of the given pair of frames. After generating detected bounding boxes 122 corresponding to a number of missing faces, extended face tracker 104 can update the second frame in the given pair of frames by adding the detected bounding boxes 122. As a result, the one or more faces in the second frame which were not detected by top-down face detector 102 are now detected and labeled, and therefore can be subsequently de-identified along with previously-detected faces in the second frame. Note that extended face tracker 104 continues to receive the sequence of labeled video frames 130 and process the received video frames in a pair-wise manner using lonely box detector 114 and lonely box tracker 118. As a result, extended face tracker 104 outputs the sequence of further-processed video frames 140 that are substantially free of flickering bounding boxes/missing faces.

Figure 3A:
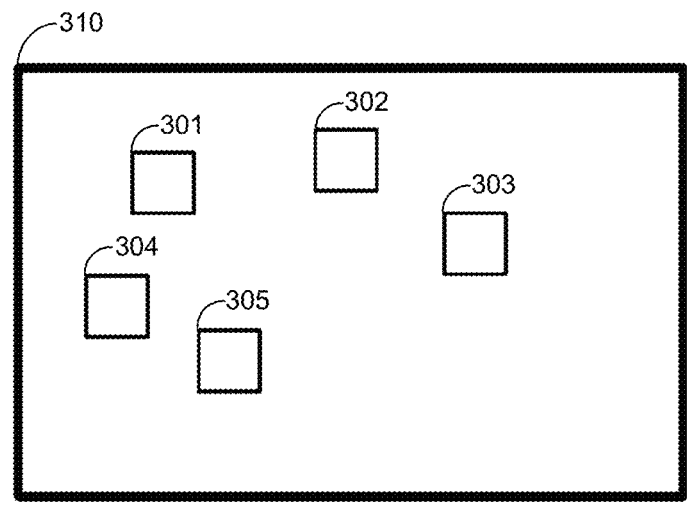
FIGS. 3A-3F illustrate an exemplary process of tracking lonely boxes and re-detecting missing faces in the second frame of a given pair of consecutive frames using the disclosed lonely box detector and lonely box tracker of the disclosed de-identification system to ensure continuous and robust face detection through a sequence of video frames in accordance with some embodiments described herein.

FIGS. 3A-3F illustrate an exemplary process of tracking lonely boxes and re-detecting missing faces in the second frame of a given pair of consecutive frames using the disclosed lonely box detector 114 and lonely box tracker 118 of the disclosed de-identification system 100 to ensure continuous and robust face detection through a sequence of video frames in accordance with some embodiments described herein. More specifically, FIG. 3A shows 5 detected face bounding boxes (or "detected faces" hereinafter) 301 to 305 in the first frame 310 of the given pair of frames using top-down face detector 102 in accordance with some embodiments described herein. Note that the 5 detected faces are illustrated with 5 solid-line boxes at various locations in the first frame 310. Note that the number of 5 detected faces is only used as an example. Other embodiments can include greater or fewer than 5 detected faces in the first frame of a given pair of frames.

Figure 3B:
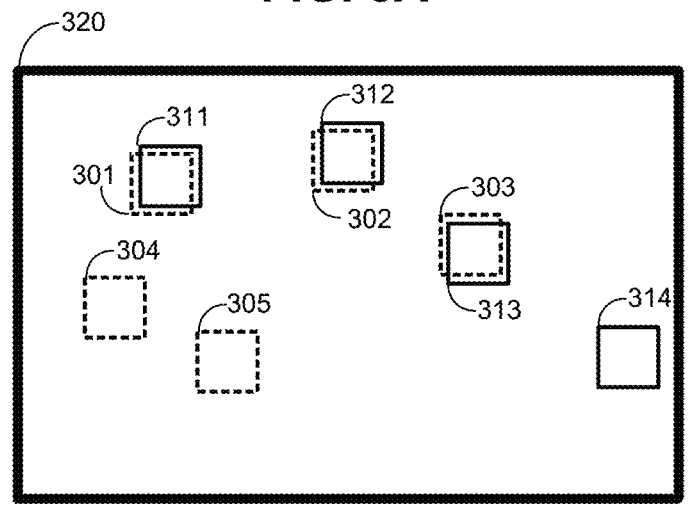

FIG. 3B shows 4 detected faces 311 to 314 in the second frame 320 of the given pair of frames using top-down face detector 102 in accordance with some embodiments described herein. Note that the 4 detected faces in frame 320 are illustrated with 4 corresponding solid-line boxes to indicate that they are currently-detected in the second frame 320. In contrast, in second frame 320, the previously-detected 5 faces in the first frame 310 are also shown but in dashed lines to indicate that they were previously detected. As can also be observed in FIG. 3B, only 3 of the 5 previously-detected faces (i.e., 301 to 303) from the first frame 310 are re-detected in the second frame 320, and they are shown to overlap with the corresponding currently-detected faces (i.e., 311 to 313) with some offsets to represent the exemplary motions of these faces of from the first frame 310 to the second frame 320. FIG. 3B also shows the remaining 2 of the 5 of previously-detected faces (i.e., 304 and 305) with dashed-lines to indicate that they are missing in the second frame 320. FIG. 3B also shows that the currently-detected face 314 does not overlap with any of the previously-detected faces 301-305, indicating that it is a newly detected face.

Figure 3C:
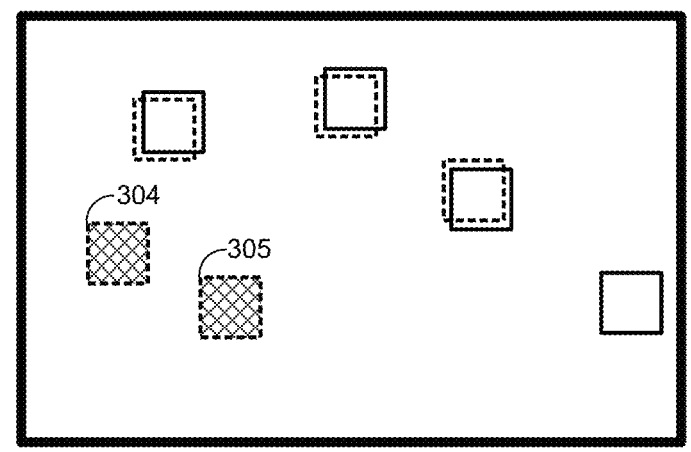

FIG. 3C shows the result of detecting lonely boxes in the first frame 310 using the disclosed lonely box detector 114 in accordance with some embodiments described herein. Above described-above, the lonely-box detector computes an IoU for each and every pair of bounding boxes formed between each of the set of previously-detected faces 301-305 in the first frame 310 and each of the set of currently-detected faces 311 to 314 in the second frame 320. As a result, two lonely boxes 304 and 305 in the first frame 310 are identified which are shown in FIG. 3C with crosshatches.

Figure 3D:
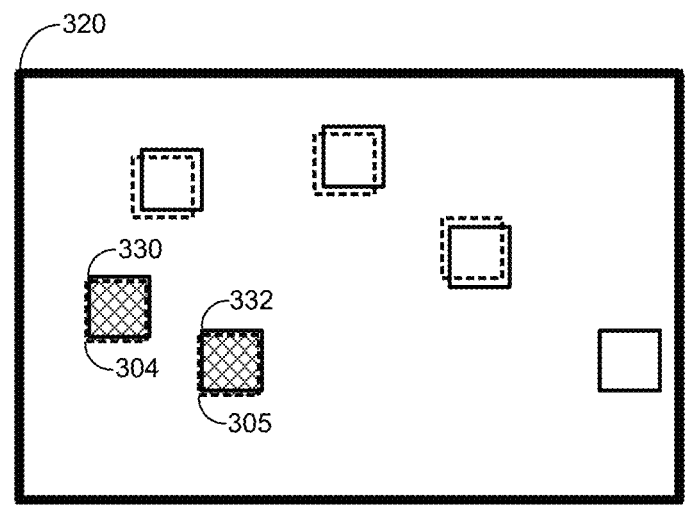
Figure 3E:
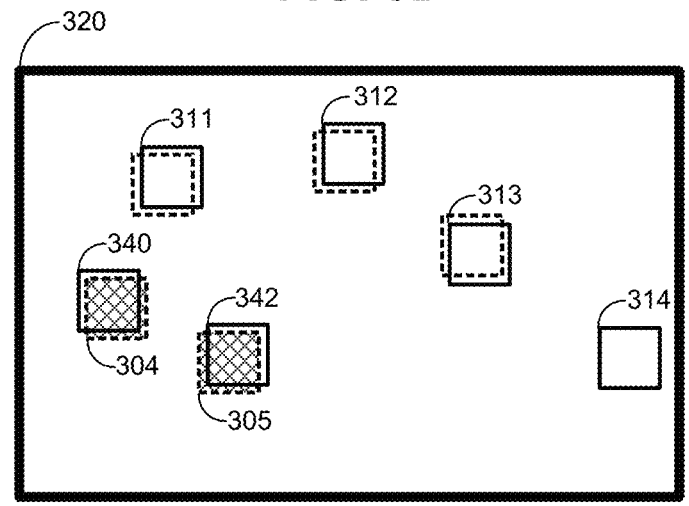
Figure 3F:
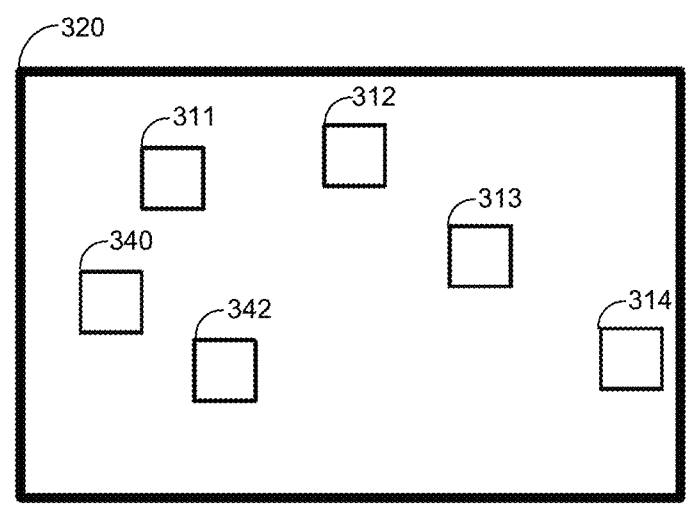

FIG. 3D shows that after lonely boxes 304 to 305 are identified, the two independent CSRT trackers 330 and 332 are instantiated in the second frame 320 as two search boxes for the detected lonely boxes 304 to 305, respectively. Note that CSRT trackers/search boxes 330 and 332 are shown to be initially located at substantially the same locations and having substantially the same dimensions as the corresponding lonely boxes 304 and 305, respectively. FIG. 3E shows that after instantiation, each of the two CSRT trackers 330 and 332 runs within the second frame 320 to search and locate the missing face associated with the corresponding lonely box in the second frame 320. As a result, the two missing faces from the second frame 320 are detected in the second frame 320 at the exemplary locations of two new bounding boxes 340 and 342. Note that the exemplary offsets between the newly-detected bounding boxes 340 and 342 and the corresponding lonely boxes 304 to 305 are used to represent the exemplary motions of the two re-detected faces from the first frame 310 to the second frame 320. Finally, FIG. 3F shows that after the two missing faces are re-detected by lonely box tracker 118, the further processed second frame 320 is updated by combining the already detected faces 311 to 314 with the newly-detected faces 340 and 342.

Now returning to FIG. 1, note that in some embodiments extended face tracker 104 can process the sequence of labeled video frames 130 via a single-pass process in a forward direction in time. In these embodiments, extended face tracker 104 simply processes the sequence of labeled video frames 130 in a normal time-progression manner from the earliest video frame to the latest video frame. Note that in these embodiments, the aforementioned first frame in the given pair of consecutive video frames is the earlier frame temporally of the two consecutive frames, whereas the aforementioned second frame in the given pair of frames is the later frame temporally of the two consecutive frames.

It has been observed that the flicker-removal/face-detection results can be further improved if extended face tracker 104 is applied twice on the output sequence of video frames 130 of top-down face detector 102: once in the forward direction and once in the reverse direction. In these embodiments, extended face tracker 104 is configured to process the sequence of labeled video frames 130 using a two-pass procedure including a forward pass (i.e., the First Pass) and a reverse pass (i.e., the Second Pass). This two-pass procedure is demonstrated below in conjunction with FIGS. 4A and 4B.

More specifically, in the First Pass of the disclosed two-pass procedure, extended face tracker 104 is configured to process the sequence of labeled video frames 130 in a forward direction in time to generate a sequence of temporally-processed video frames. Note that the First Pass in the two-pass procedure is essentially the above-described single-pass process. In other words, extended face tracker 104 processes the sequence of labeled video frames 130 in a normal time-progression manner from the earliest video frame to the latest video frame in the First Pass. However, in the Second Pass of the two-pass procedure, extended face tracker 104 is configured to further process the sequence of temporally-processed video frames in a reverse direction in time to generate a sequence of further-processed video frames. In other words, extended face tracker 104 subsequently processes the sequence of temporally-processed video frames reversely in time from the latest video frame to the earliest video frame in the Second Pass. A person of ordinary skill in the art can appreciate that in the Second Pass of the disclosed two-pass procedure, the aforementioned first frame in the given pair of consecutive video frames becomes the later frame of the two consecutive frames, whereas the aforementioned second frame in the given pair of consecutive frames becomes the earlier frame of the two consecutive frames, simply because the second frame is processed before the first frame.

Note that compared to the single-pass process of extended face tracker 104, the two-pass procedure of extended face tracker 104 allows those flickering frames in the sequence of labeled video frames 130 that potentially missed by the single-pass (i.e., forward) process to be searched and processed for the second time and in a different manner from the single-pass process. Hence, the disclosed OR de-identification system 100 using the two-pass procedure allows more missing faces/bounding boxes to be detected, and the overall performance to be significantly improved. However, it should be note that because the Second Pass in the two-pass procedure processes the sequence of labeled video frames backward in time, it cannot be applied to the sequence of labeled video frames 130 in real-time but rather used as a post-processing step. In contrast, the single-pass process of extended face tracker 104 can be potentially applied to the sequence of labeled video frames 130 as a real-time process.

Figures 4A, 4B:
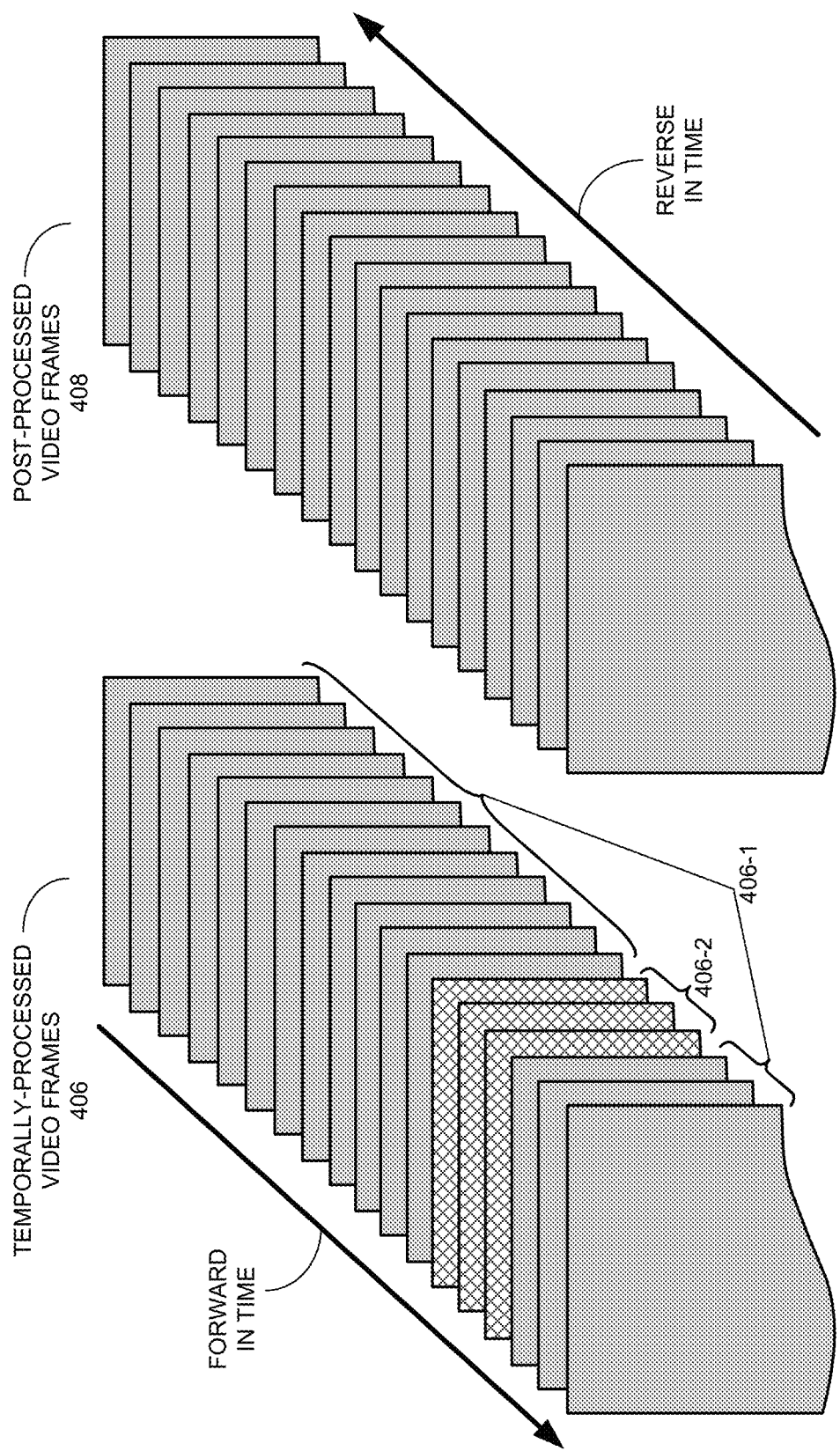
FIG. 4A illustrates an exemplary process and output after applying the First Pass of the disclosed two-pass procedure of the extended face tracker to the sequence of labeled video frames generated by the top-down face detector in accordance with some embodiments described herein.
FIG. 4B illustrates an exemplary process and output after applying the Second Pass of the disclosed two-pass procedure of the extended face tracker to the sequence of temporally-processed video frames in FIG. 4A in accordance with some embodiments described herein.

FIG. 4A illustrates an exemplary process and output after applying the First Pass of the disclosed two-pass procedure of extended face tracker 104 to the sequence of labeled video frames 204 in FIG. 2 generated by top-down face detector 102 in accordance with some embodiments described herein. As can be seen in FIG. 4A, after processing the sequence of labeled video frames 204 in the forward direction using extended face tracker 104, an exemplary sequence of temporally-processed video frames 406 is obtained. This exemplary sequence of temporally-processed video frames 406 is shown to include two types of frames:

fully-labeled frames 406-1 that do not include the above-described flickering bounding boxes/missing faces are represented in solid gray color; and incompletely-labeled frames 406-2 that still include the above-described flickering bounding boxes/missing faces are represented with cross-hatches. Compared with the sequence of labeled video frames 204 which includes a high number of incompletely-labeled frames, the sequence of temporally-processed video frames 406 only have a few remaining incompletely-labeled frames. Note that the particular configuration of the fully-labeled frames and incompletely-labeled frames in the sequence of temporally-processed video frames 406 is only used for illustration purposes. For example, other exemplary results of the First Pass of the disclosed two-pass procedure can contain a larger or smaller number of incompletely-labeled frames than the example shown. However, it should be clear that the sequence of temporally-processed video frames 406 and those other exemplary results should contain a significantly smaller number of incompletely-labeled frames than the number of incompletely-labeled frames 204-2 shown in FIG. 2. Note that it is also possible that the sequence of temporally-processed frames generated by the First Pass of two-pass procedure no longer includes any incompletely-labeled frames.

FIG. 4B illustrates an exemplary process and output after applying the Second Pass of the disclosed two-pass procedure of extended face tracker 104 to the sequence of temporally-processed video frames 406 in FIG. 4A in accordance with some embodiments described herein. As can be seen in FIG. 4B, after processing the sequence of temporally-processed video frames 406 reverse in time using the disclosed extended face tracker 104, a corresponding sequence of post-processed video frames 408 is obtained. Note that the exemplary sequence of post-processed video frames 208 after applying the Second Pass of the two-pass procedure is shown to include only fully-labeled frames represented in solid gray color. In other words, the remaining undetected faces in the incompletely-labeled frames 406-2 after the First Pass of the two-pass procedure are detected and the corresponding bounding boxes are added to the incompletely-labeled frames 406-2. While other exemplary results of the Second Pass of the disclosed two-pass procedure may or may not contain incompletely-labeled frames, it should be clear that these other exemplary results should contain a smaller number of incompletely-labeled frames than the number of incompletely-labeled frames 406-2 shown in the sequence of temporally-processed video frames 406.

Returning again to the OR de-identification system 100 of FIG. 1, note that top-down face detector 102 and extended face tracker 104 can be used in an alternating manner to process an OR video. In other words, the sequence of video frames 120 may be regulated to correspond to a predetermined time duration of the OR video, e.g., between 1 to 3 seconds. This means that extended face tracker 104 will also operate on the sequence of labeled video frames 130 for the same time duration and automatically turns off. Next, top-down face detector 102 is turned on again to process the next sequence of video frames 120 for the same predetermined time duration, before extended face tracker 104 will automatically turn on again, and the processing cycle repeats.

Note that the significance of regulating the duration of the video-frame processing cycle is that, if the duration of the sequence of video frames 120 is set too long, extended face tracker 104 will be active for too long in each cycle and start generating false positives. For example, if a previously-detected person becomes fully occluded for an unusually long period of time (e.g., 30 seconds), extended face tracker 104 may continue to search for the missing person during the entire predetermined time duration. In this scenario, the longer extended face tracker 104 searches for the missing person (which is determined by the duration of the sequence of video frames 120), the higher probability that extended face tracker 104 will end up generating a false positive of the missing person (e.g., by detecting a different person).

In some embodiments, extended face tracker 104 can also include a mechanism to actively prevent false positives by checking the confidence level of each newly-generated bounding box. If the confidence level is determined to become too low (e.g., by comparing to a predetermined low confidence-level threshold), the disclosed mechanism stops extended face tracker 104 from generating more bounding boxes for the detected face in the subsequently video frames. Note that it has been observed that the confidence levels of the bounding boxes of a detected face generally become very low right before the bounding box for the detected face flickers in the next video frame. Because a bounding box having a sufficiently low confidence level is highly likely to be a false positive, actively checking confidence levels and preventing new bounding boxes to be generated when the confidence levels become too low provide a dynamic false-positive reduction/prevention mechanism.

In some embodiments, to avoid those situations where false positives are generated by extended face tracker 104 before the missing persons reappear or return, the predetermined time duration corresponding to the sequence of video frames 120 can be determined as follows. We analyze a validation dataset of the OR videos, and determine how long it takes for a majority (in term of percentage) of the lonely boxes/missing faces to reappear again. In some embodiments, this majority is set to between 90%-95%. This determined time is then used as the predetermined time duration for both top-down face detector 102 and extended face tracker 104. By setting the predetermined time duration in this manner, the disclosed OR de-identification system 100 can avoid creating false positives for those lonely boxes/missing faces that disappear for unusually long time periods. Note that the predetermined time duration corresponding to the sequence of video frames 120 should also not be set too short, otherwise the effectiveness of extended face tracker 104 to search for the missing faces based on the temporal relationships in consecutive frames can be reduced.

Note that in the above-described IoU-based technique used by lonely box detector 114 to identify lonely boxes, an additional condition may be applied to a given detected lonely box before instantiating an object tracking process for the given lonely box. In these embodiments, a given detected lonely box is only qualified for CSRT tracking by lonely box tracker 118 if the given detected lonely box is associated with a sufficiently low confidence level when the corresponding bounding box disappears. This qualification condition arises from data analysis results indicating that a general behavior of a missing face is when the confidence levels of the corresponding bounding boxes in the previously-detected frames gradually reduce in value until the bounding box disappears. Note that by applying this qualification condition to lonely box detector 114, the disclosed extended face tracker 104 can avoid tracking those high-confidence lonely boxes that are often associated with missing faces that have gone out of the video frames and left the recorded scenes.

Ensemble Face Detection

In some embodiments, to further improve the robustness and increase the sensitivity of the OR de-identification system 100, OR de-identification system 100 can include at least one additional face detection module/subsystem that operates independently from the above-described face-detection mechanism using top-down face detector 102 and face tracker 104. For example, de-identification system 100 shows that, in parallel to the above-described face-detection/face-tracking two-stage system, de-identification system 100 further includes a face detection module 150 that implements a second face detector 152. As can be seen in FIG. 1, face detection module 150 is configured to separately receive the same sequence of raw video frames 120, perform the intended face detection operations on the sequence of raw video frames using second face detector 152, and subsequently produce a second sequence of processed video frames 160 including the detected faces/bounding boxes. In some embodiments, to enable ensemble deep learning, second face detector 152 is constructed and trained based on a different face-detection model from the top-down face detector.

In OR de-identification system 100, the second sequence of processed video frames 160 is combined with the sequence of further-processed video frames 140 to generate a combined sequence of face-detected video frames 170. In some embodiments, the combined sequence of face-detected video frames 170 can be obtained by merging the face-detection results of the above-described two-stage face-detection/face-tracking mechanism and the second face detector 152. In other words, the detected faces in a given frame in the combined sequence of face-detected video frames 170 can be the union of the detected faces in the corresponding frame from the sequence of further-processed video frames 140 and the detected faces in the corresponding frame from the second sequence of processed video frames 160.

Finally in FIG. 1, the combined sequence of face-detected video frames 170 is received by a personal identifiable information (PII) de-identifier 134 in the OR de-identification system 100. In various embodiments, PII de-identifier 134 can be configured to use one of a number of common and effective image de-identification techniques (e.g., blurring, pixilation, or blanking) on all generated bounding boxes in the combined sequence of face-detected video frames 170, thereby removing PII from the original sequence of video frames 120. This includes de-identifying those detected hard faces, such as tiny faces, partial faces, backward-facing faces, faces heavily covered by PPEs, and faces under extremely low or strong illustration condition that would normally be missed existing face detection techniques. OR de-identification system 100 subsequently outputs a sequence of anonymized video frames 180 free of PII.

Note that by using and combining at least two different deep-learning-based face-detection mechanisms, the disclosed de-identification system 100 incorporates the concept of ensemble deep learning. That is, when multiple different face detection techniques are constructed and trained differently and independently, these different techniques are associated with different types of false negatives (i.e., having different types of errors).

However, when the multiple different face-detection techniques are used collectively and concurrently, the combined face-detection system provides a stronger and more robust face-detection mechanism that can be used to handle a wider range of face-detection scenarios. Consequently, the combined face-detection result from the multiple face-detection techniques also includes a fewer number of false negatives (i.e., missing faces) than the face-detection result from each individual face-detection technique.

Figure 5A:
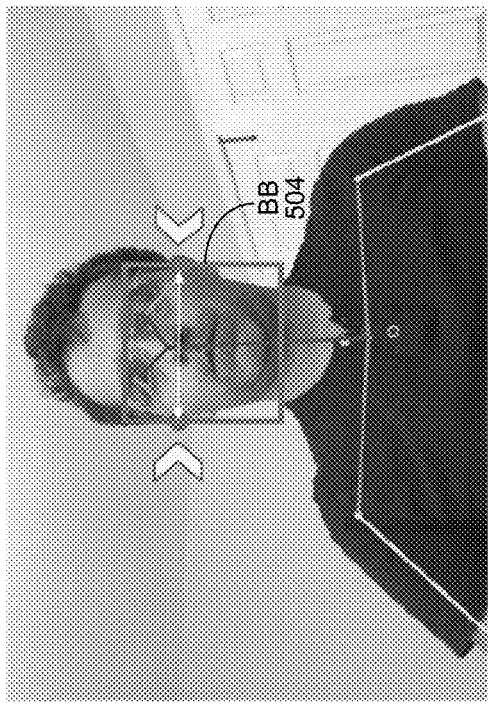
FIGS. 5A-5D show various examples of face bounding box estimation based on various combinations of detected facial keypoints in accordance with some embodiments described herein.
Figure 5B:
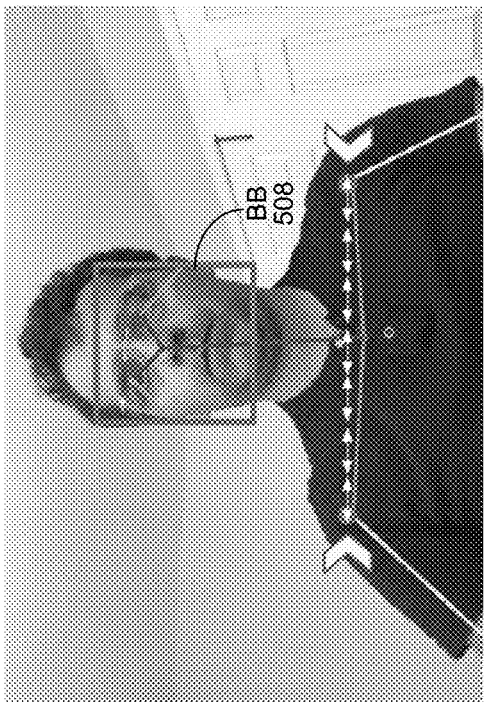
Figure 5C:
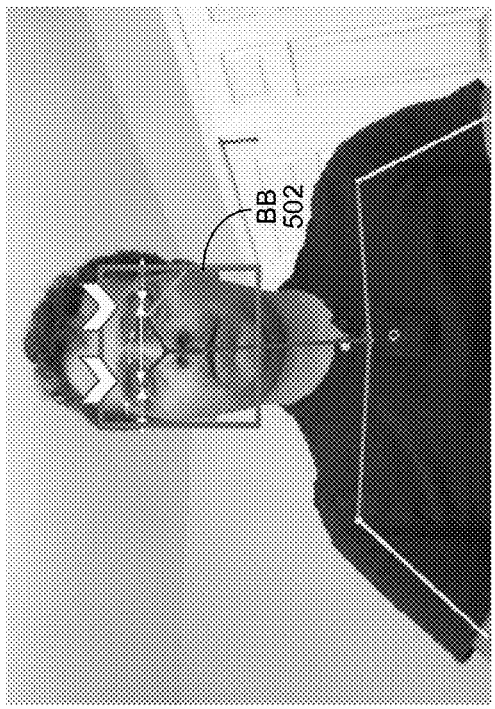
Figure 5D:
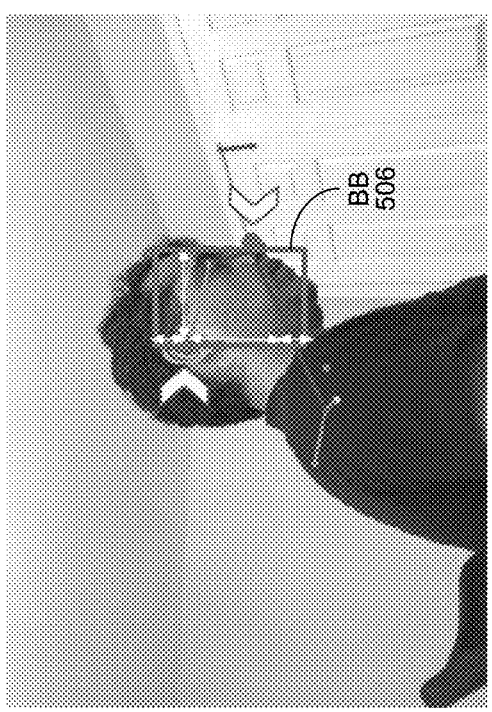

In a particular embodiment, the second face detector 152 is implemented with a disclosed face-detection technique referred to as "hybrid pose-keypoint detection." Generally speaking, the hybrid pose-keypoint detection technique can perform more conventional face bounding box detection using common facial/head keypoints. For example, FIGS. 5A-5D show various examples of face bounding box estimation based on various combinations of detected facial keypoints in accordance with some embodiments described herein. Specifically, FIG. 5A shows determining a front-facing face bounding box (BB) 502 based on detecting the left and right eyes; FIG. 5B shows determining a different front-facing face BB 504 based on detecting the left and right ears. Note that BB 504 is smaller than BB 502 because of the different facial keypoints are used. FIG. 5C shows determining a right-facing face BB 506 based on detecting the nose and the right ear. Note that BB 506 is significantly smaller than both BB 502 and BB 504 to represent a smaller face of the detected person. Note that in the example of FIG. 5D, no facial/head keypoint is used. Instead, the hybrid pose-keypoint detection technique can use only the detected body keypoints to infer the face location and size, which is useful when no facial keypoints are detected. In other words, face localization may be achieved exclusively based on detecting certain keypoints on the human body outside of the human head. For example, FIG. 5D shows determining a front-facing face BB 508 based on detecting two body keypoints: the left and right shoulders of the human body. Generally speaking, without detecting any facial keypoint, it is difficult to estimate the dimensions of the face bounding box shown in the example of FIG. 5D.

In some embodiments, the disclosed pose-keypoint face detection technique can combine at least one detected facial keypoint with a detected body keypoint outside of the face to determine both the face location/orientation and the dimensions of the face bounding box. Moreover, the disclosed pose-keypoint face detection technique takes into account the fact that in a crowded space with heavy occlusions such as an OR, the detected human keypoints (either a facial keypoint or a body keypoint) often change from one frame to the next frame in a sequence of video frames. Hence, combining different facial keypoints and body keypoints for face localization in a sequence of video frames can increase the confidence of the bounding box estimations and reduce flickering.

Figure 6A:
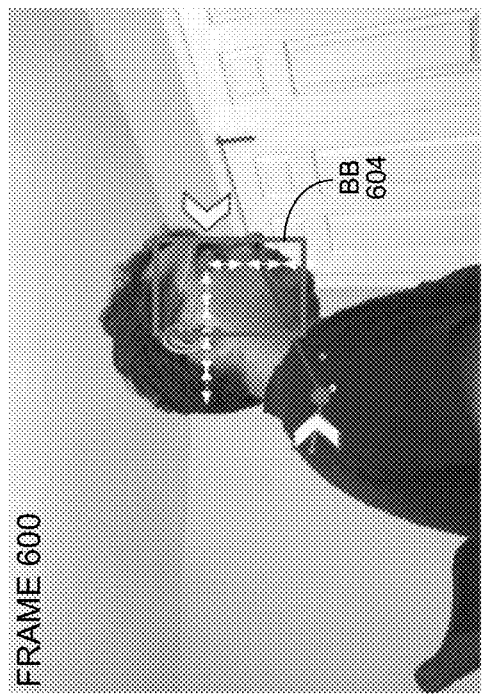
FIGS. 6A-6D show various examples of estimating a face bounding box of a person in a given video frame using different viable combinations of detected facial keypoints and detected body keypoints in accordance with some embodiments described herein.
Figure 6B:
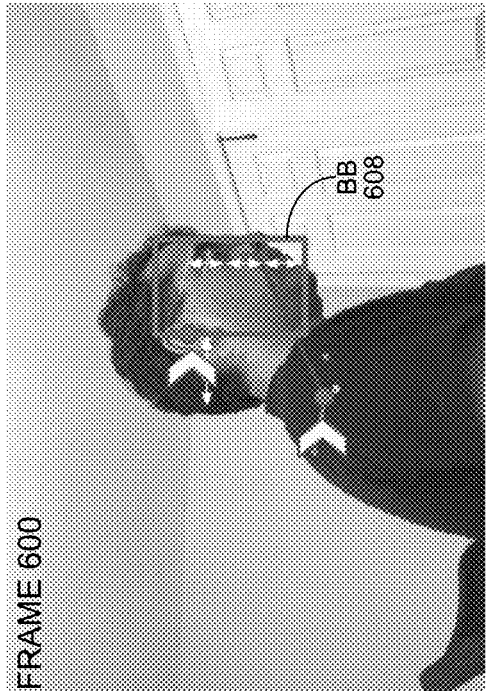
Figure 6C:
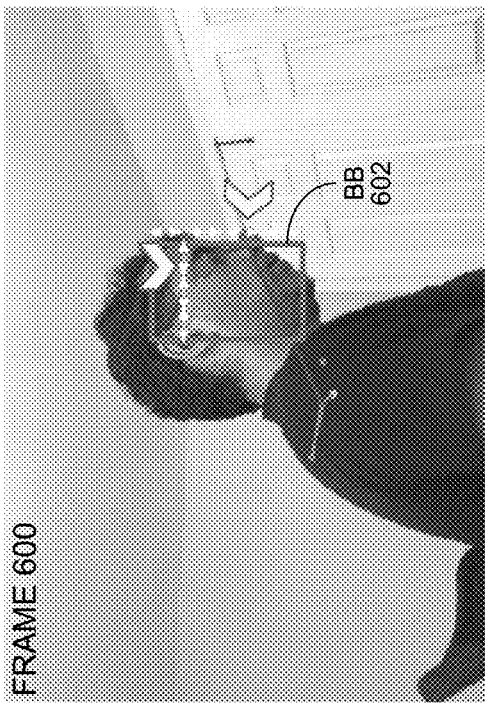
Figure 6D:
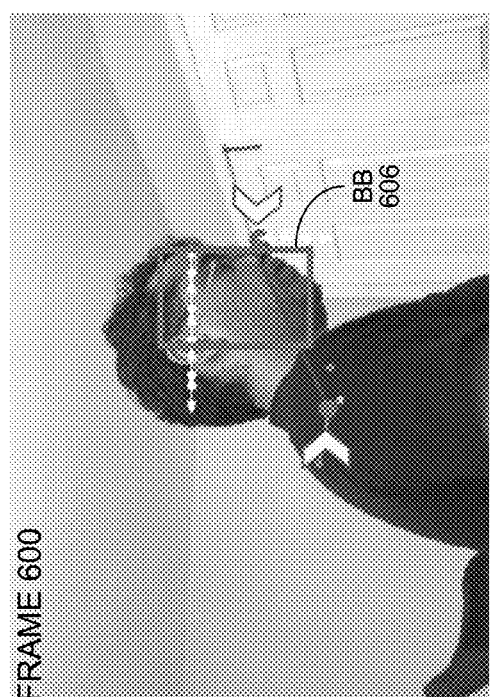

FIGS. 6A-6D show various examples of estimating a face bounding box of a person in a given video frame 600 using different viable combinations of detected facial keypoints and detected body keypoints in accordance with some embodiments described herein. Specifically, FIG. 6A shows that in frame 600, a face bounding box (BB) 602 is estimated based on two detected facial keypoints: the right eye and the nose. FIG. 6B shows that in frame 600, a new face BB 604 is estimated based on one detected facial keypoint: the right eye; and one detected body keypoint outside of the face: the right shoulder. As a variation to the example of FIG. 6B, FIG. 6C shows that in frame 600, a new face BB 606 is estimated based on one alternative detected facial keypoint: the nose; and one detected body keypoint: the right shoulder. However, the disclosed pose-keypoint face detection technique can also use non-facial head-keypoints to estimate the face bounding box. For example, FIG. 6D shows that in frame 600, a new face BB 608 is estimated based on one detected head keypoint: the right ear; and one detected body keypoint: the right shoulder.

Note that distance between detected keypoints may improve face detection accuracy: e.g., in FIG. 6C, a higher BB estimation accuracy can be achieved because the larger distance between the detected nose-shoulder keypoints reduces the error of the detected nose location. In contrast, the BB estimation accuracy in 6A may be lower because the detected nose-eye keypoints are close to each other and therefore more prone to detection errors. Hence, in the disclosed pose-keypoint face detection technique, it is preferable to include at least one body keypoint in addition to detecting at least one facial/head keypoint. Note that while FIGS. 6A-6D showed using different face-body-keypoint combinations to determine a face bounding box of a given person in the same video frame, different face-body-keypoint combinations can be used in a sequence of video frames to determine a face bounding box of a given person in each frame of the sequence of video frames. Hence, the disclosed pose-keypoint face detection technique provides a higher degree of flexibility of detecting a face in either a single frame or a sequence of video frames based on the availability of both facial/head keypoints and body keypoints. As have been described above, the disclosed pose-keypoint face detection technique can be used in the second face detector 152 of face detection module 150 in the disclosed OR de-identification system 100, and in combination with the disclosed face-detection techniques using top-down face detector 102 and extended face tracker 104 to provide high-robustness high-sensitivity face detections in a cluttered OR environment.

Other Applications of the OR De-Identification System

Note that in addition to the above-described functions of OR video de-identification and PII anonymization, the disclosed OR de-identification system 100 can also be used to accurately count the number of people in the OR in each processed video frame based on the number of detected bounding boxes in each processed frame. Note that this OR personnel counting function cannot be achieved by existing face-detection techniques because they are not able to detect many types of hard faces described above, and as a result highly inaccurate if used to for people counting. In contrast, by using the disclosed extended face tracker on top of the top-down face detector and by combining the results of at least two different face-detection techniques through ensemble face detection, the disclosed OR de-identification system 100 can accurately count the number of people in the OR regardless of the head poses and orientations or lack of facial features.

Note that the ability to keep an accurate count of people in the OR can have multiple clinical significances. Firstly, keeping an accurate and constant head count in the OR can be extremely useful to monitor the rate of increase or decrease in the number of people in the OR. Keeping track of this rate of change in the number of people in the OR can be highly meaningful for a number of reasons. For example, an excessive traffic in an OR can jeopardize patient safety by risking the sterility of the environment. Hence, detecting that the number of people in the OR is changing rapidly would indicate a level of chaos in the OR, which would allow the OR staff to identify and reduce unnecessary movements in the OR. Secondly, the detected level of traffic in an OR can be used as a proxy/indicator to determine which phase of the surgical procedure is currently taking place. For example, when we determine, using the disclosed OR de-identification system that for about 30 minutes to 1 hour, there are no more than 1-2 people in the OR, we could reasonable assume that the OR is free of patient and is being prepared for the next patient. In contrast, when we detect that up to 15 people are moving around in the OR, we could reasonable assume that the patient is under the operation. Hence, using the people counting ability of the disclosed OR de-identification system, it is possible to detect the precise time when the patient has left the OR, which would allow the OR staff to bring in the next patient into the OR without a delay. This seamless patient transition improves the OR efficiency by enabling the hospital to take care of more patients per day, leading to cost reduction for both patients and the hospital, and facilitating more efficient OR scheduling.

Note that an additional benefit of the disclosed OR de-identification system's ability to reliably detect every person in the OR is that, through the sequence of bounding boxes of each detected person in the OR, the speed of motion of each person in the OR can be conveniently and accurately estimated. This speed/motion information can be used as an indicator or measurement of levels of the OR activities. Based on the different levels of OR activities derived from the measured speeds of movements of the OR personnel, it is possible to determine whether OR activities such as surgical procedures are taking place in a normal fashion, or in an unusual, e.g., more chaotic manner.

Figure 7:
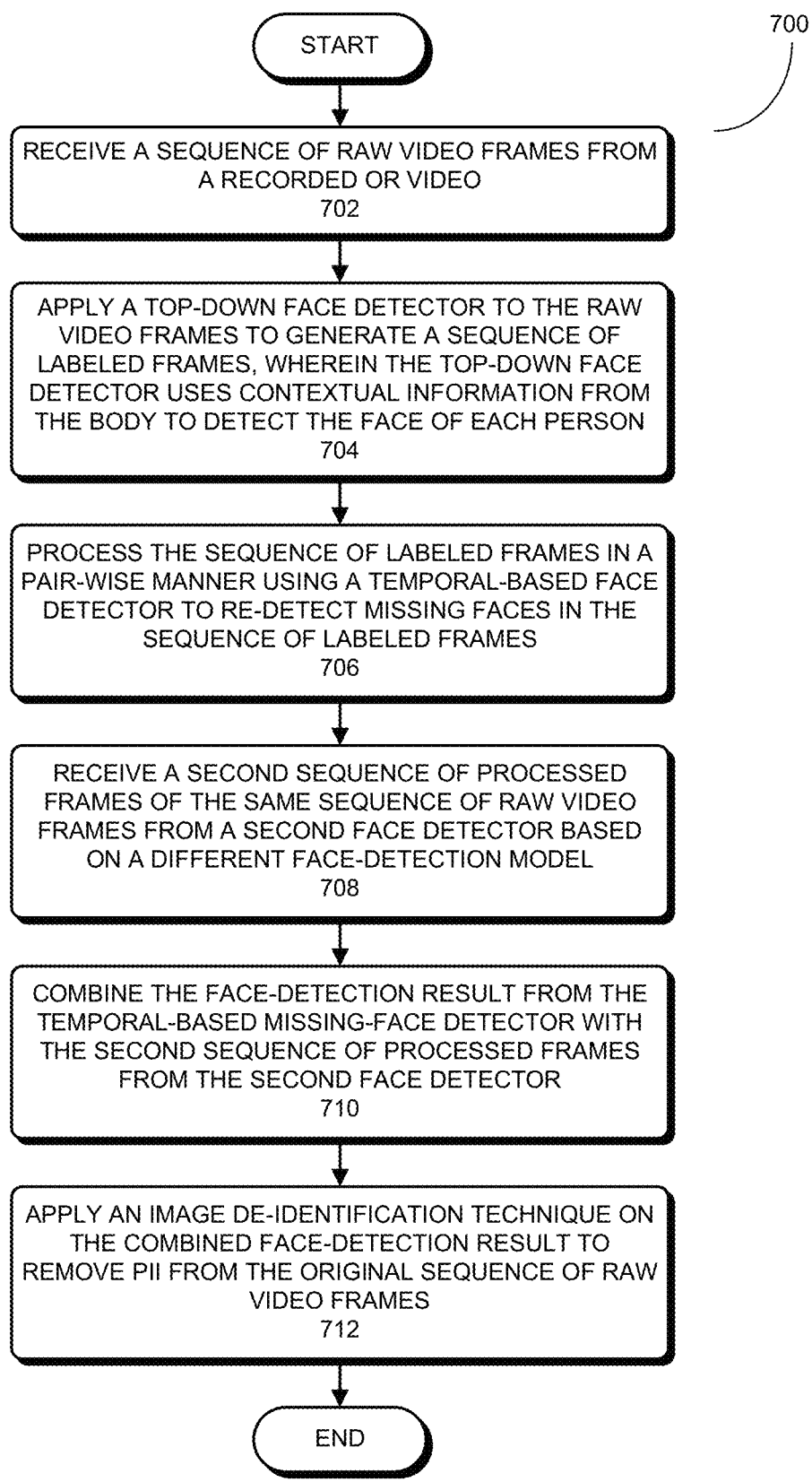
FIG. 7 presents a flowchart illustrating an exemplary process for detecting both easy and hard faces and de-identifying any person captured in an OR video in accordance with some embodiments described herein.

FIG. 7 presents a flowchart illustrating an exemplary process 700 for detecting both easy and hard faces and de-identifying any person captured in an OR video in accordance with some embodiments described herein. In one or more embodiments, one or more of the steps in FIG. 7 may be omitted, repeated, and/or performed in a different order. Accordingly, the specific arrangement of steps shown in FIG. 7 should not be construed as limiting the scope of the technique.

Process 700 may begin by receiving a sequence of raw video frames from a recorded OR video (step 702). Note that when the OR video is recorded during a surgical procedure, the sequence of raw video frames generally includes many instances of hard-to-detect faces (i.e., the hard faces), including but not limited to, tiny faces, partial faces, backward-facing faces, and faces heavily covered by PPEs such as face masks, face shields, goggles, and glasses, and faces occluded by other OR staff and OR equipment, as well as small faces with low resolutions, and faces under very low and too-strong illuminations. Next, process 700 applies a top-down face detector to the sequence of raw video frames to detect human faces within each frame and output a sequence of labeled frames, wherein the top-down face detector is configured to use contextual information from the body of a person to detect the face of the person (step 704). For example, the top-down face detector can be implemented with a Single Stage Headless Face Detector (SSH).

Process 700 further processes the sequence of labeled frames outputted from the top-down face detector in a pair-wise manner using a temporal-based missing-face tracker/detector to detect those missing faces in a subset of frames of the sequence of labeled frames missed by the top-down face detector (step 706). In some embodiments, this temporal-based missing-face tracker/detector can also include two stages configured to perform the above-described two-stage procedure. More specifically, the two stages of the temporal-based missing-face tracker/detector can include a lonely box detector configured to detect each bounding box that was detected in the first frame of a pair of consecutive frames but subsequently missing in the second frame of the pair of consecutive frames, i.e., a lonely box. For example, the lonely box detector can compute a set of IoU values for pairs of bounding boxes formed between each detected bounding box in the first frame and each bounding box in the second frame.

The two stages of the temporal-based missing-face tracker/detector can also include a lonely-box tracker configured to instantiate one or more object trackers based on the one or more identified lonely boxes by the lonely box detector, and subsequently search and locate each of the missing bounding boxes in the second frame corresponding to the identified lonely boxes. For example, the lonely box tracker can be implemented with a CSRT which is configured to search a region of interest (ROI) in the second frame around the corresponding location of the identified lonely box using a correlation filter trained on compressed features, such as HoG of the identified lonely box. Note that the temporal-based missing-face tracker/detector continues to receive and process the sequence of labeled frames in a pair-wise manner and outputs the sequence of further-processed frames that are substantially free of missing faces.

Process 700 also separately receives a second sequence of processed frames of the same sequence of raw video frames generated by a second face detector that was constructed and trained based on a different face-detection model from the top-down face detector (step 708). In some embodiments, the second face detector is implemented with the disclosed hybrid pose-keypoint face detection technique. Next, process 700 combines (e.g., by merging) the sequence of further-processed frames outputted by the temporal-based missing-face tracker/detector with the second sequence of processed frames from the second face detector (step 710). Note that because the second face detector and the top-down face detector are constructed and trained with different deep-learning models, merging the two sources of the face-detection results enables ensemble deep learning. Note that while conventional bottom-up face detection techniques may not be able to detect those hard cases when the human face is not facing the camera, the disclosed hybrid pose-keypoint face detection technique is constructed to be independent from the face angle/pose and can detect the location of the human face/head based on non-facial keypoints such as the ears regardless of face angle/pose. Finally, process 700 applies an image de-identification technique on the combined face-detection result to remove PII from the original sequence of raw video frames (step 712).

Figure 8:
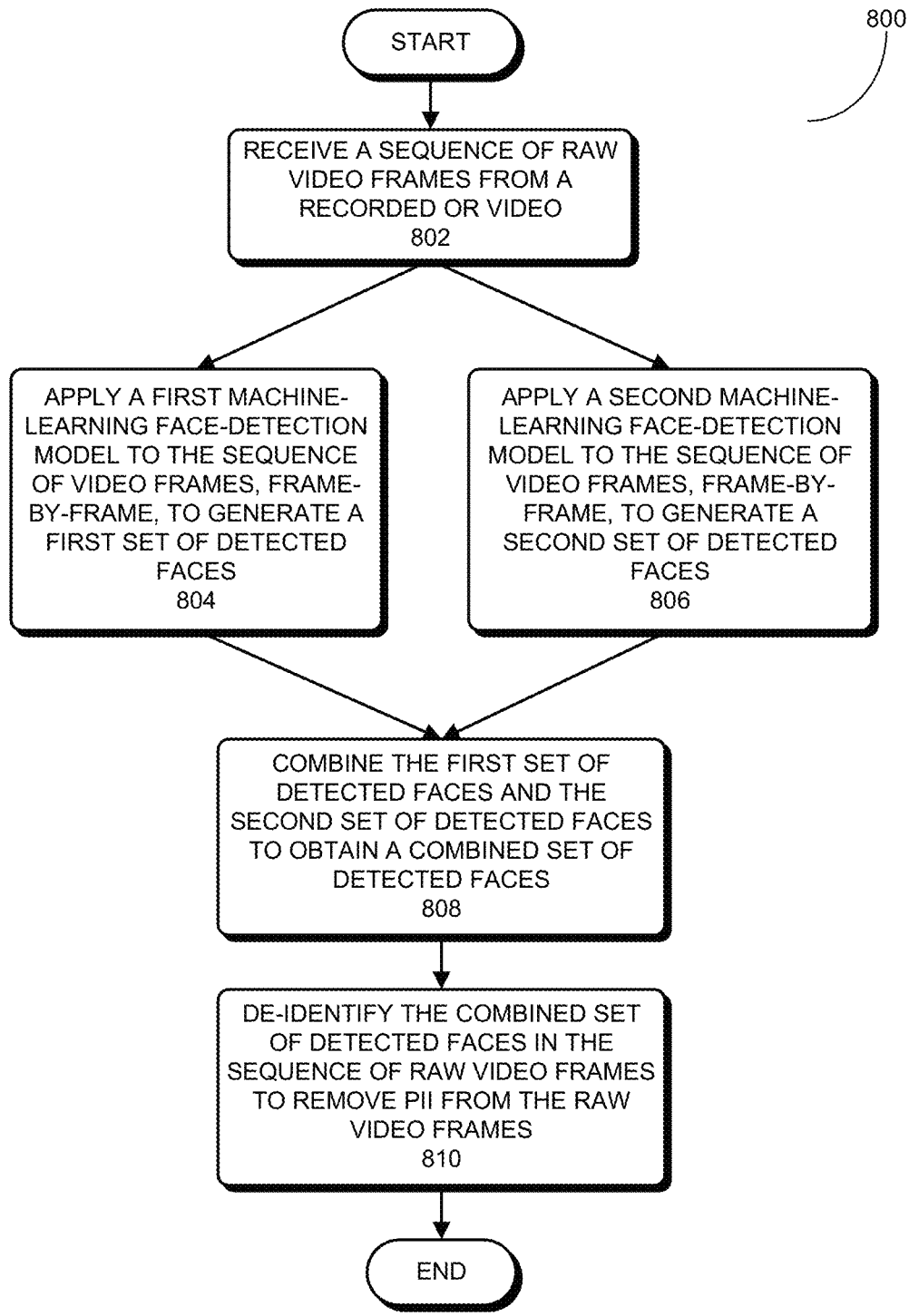
FIG. 8 presents a flowchart illustrating an exemplary process for detecting OR personnel and subsequently de-identifying any detected faces in an OR video in accordance with some embodiments described herein.

FIG. 8 presents a flowchart illustrating an exemplary process 800 for detecting OR personnel and subsequently de-identifying any detected faces in an OR video in accordance with some embodiments described herein. In one or more embodiments, one or more of the steps in FIG. 8 may be omitted, repeated, and/or performed in a different order. Accordingly, the specific arrangement of steps shown in FIG. 8 should not be construed as limiting the scope of the technique.

Process 800 may begin by receiving a sequence of raw video frames from a recorded OR video (step 802). Note that when the OR video is recorded during a surgical procedure, the sequence of raw video frames generally includes many instances of hard-to-detect faces (i.e., hard faces), including but not limited to, tiny faces, partial faces, backward-facing faces, and faces heavily covered by PPEs such as masks, face shields, glasses, and faces occluded by other OR staff and OR equipment, as well as faces with low resolutions, and faces under very low and too-strong illuminations. Next, process 800 applies a first machine-learning face-detection model to the sequence of video frames, frame-by-frame, to generate a first set of detected faces (step 804). In some embodiments, the first machine-learning model uses a top-down face detector, such as a SSH that detects human faces using contextual information from the body of a person. Note that this type of face detector can detect faces that are lack of facial features.

Process 800 also applies a second machine-learning face-detection model to the sequence of video frames, frame-by-frame, to generate a second set of detected faces (step 806). In some embodiments, the second machine-learning model uses a hybrid pose-keypoint face detector which is configured to detect a face of a person in a video frame using the following steps: (1) detecting two or more keypoints of the person, wherein each of the two or more keypoints can be either a face keypoint on the face of the person or a body keypoint on the body but outside of the face of the person; (2) determining a location of the face based on the detected two or more keypoints; (3) estimating a size of the face based on a distance between the detected two or more keypoints; and (4) determining a bounding box for the face of the person based on the determined the position and the estimated size of the face. Note that because steps 804 and 806 are two independent processing steps, they can be taken in parallel as shown in FIG. 8. However, steps 804 and 806 may also be taken as a sequence.

Next, process 800 combines the first set of detected faces and the second set of detected faces to obtain a combined set of detected faces (step 808). In some embodiments, the combined set of detected faces is simply the union of the first set and the second set of detected faces. Note that the first set of detected faces can include a first set of false negatives (i.e., faces missed by the first face-detection model), while the second set of detected faces can include a second set of false negatives (i.e., faces missed by the second face-detection model). However, because the first and the second machine-learning face-detection models use significantly different face-detection techniques and are trained differently, the first set of false negatives and the second set of false negatives generally do not overlap. Hence, the combined set of detected faces has a fewer number of false negatives than both the first set of detected faces and the second set of detected faces. In other words, the combined set of detected faces can generally include a greater number of detected faces than either the first set of detected faces or the second set of detected faces. Finally, process 800 de-identifies (e.g., by blurring) the combined set of detected faces in the sequence of raw video frames to remove PII from the sequence of raw video frames and obtain a sequence of sanitized video frames (step 810).

Figure 9A:
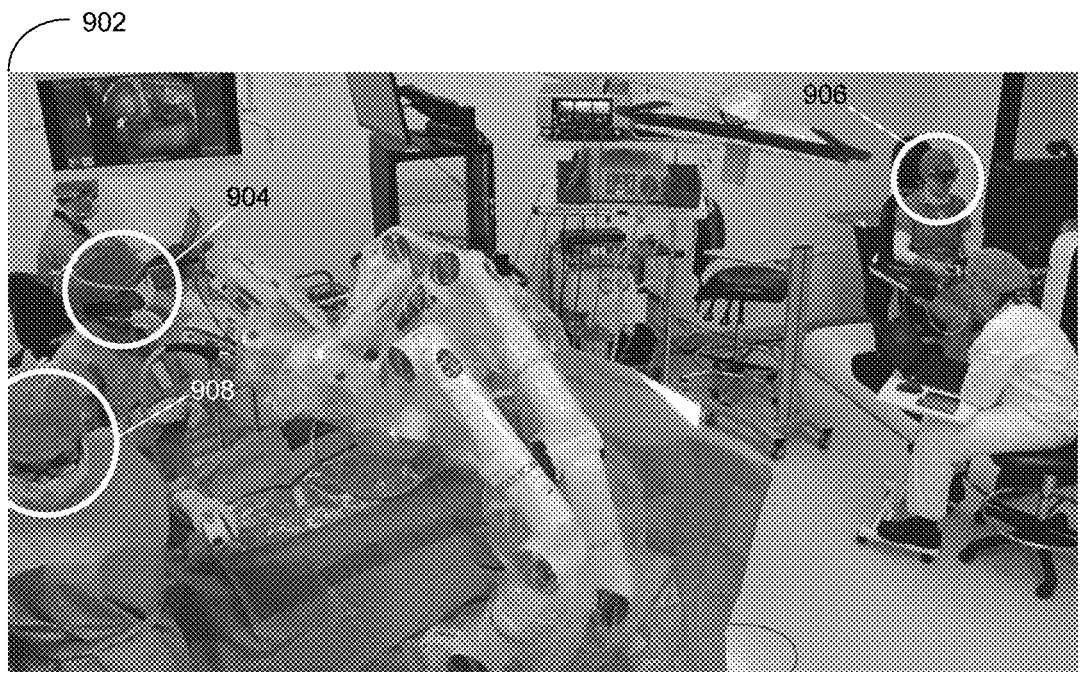
FIG. 9A shows an original/unprocessed OR video image containing multiple instances of hard faces that are covered with PPEs such as goggles, glasses and face masks in accordance with some embodiments described herein.
Figure 9B:
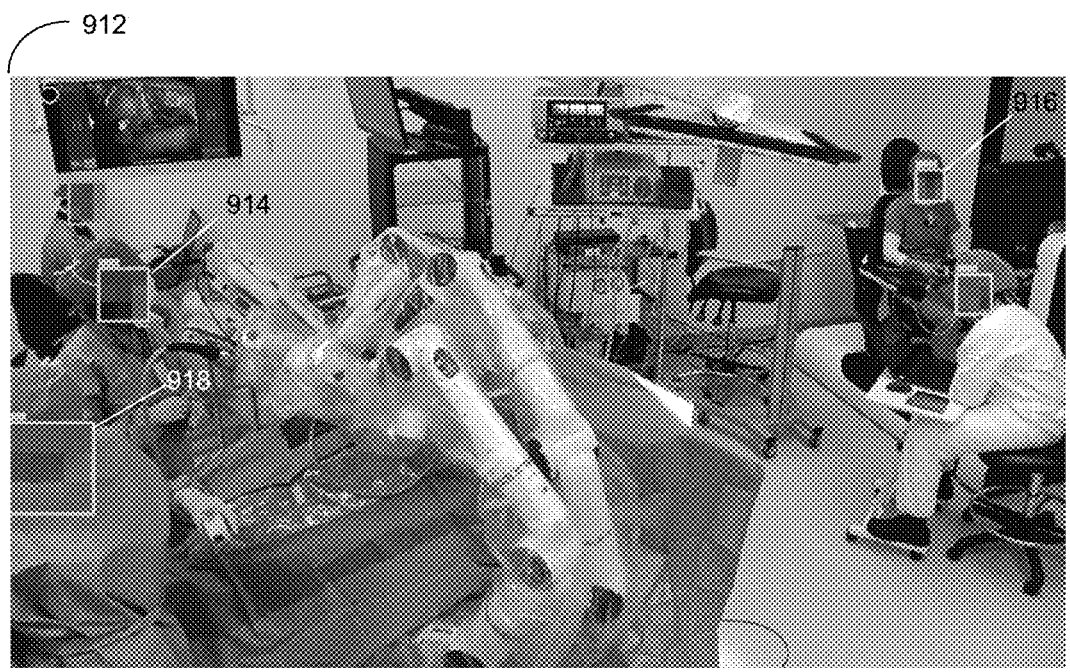
FIG. 9B shows a successfully de-identified OR video image after applying the disclosed face de-identification techniques to the original OR video image in FIG. 9A in accordance with some embodiments described herein.

FIG. 9A shows an original/unprocessed OR video image 902 containing multiple instances of hard faces 904, 906, and 908 that are covered with PPEs such as goggles, glasses and face masks in accordance with some embodiments described herein. FIG. 9B shows a successfully de-identified OR video image 912 after applying the disclosed face de-identification techniques to the original OR video image in FIG. 9A in accordance with some embodiments described herein. As can be seen in FIG. 9B, all hard faces 904, 906, and 906 in FIG. 9A are detected (with corresponding bounding boxes 914, 916, and 918) and de-identified along with a number of other successfully detected and de-identified hard faces.

Figure 10A:
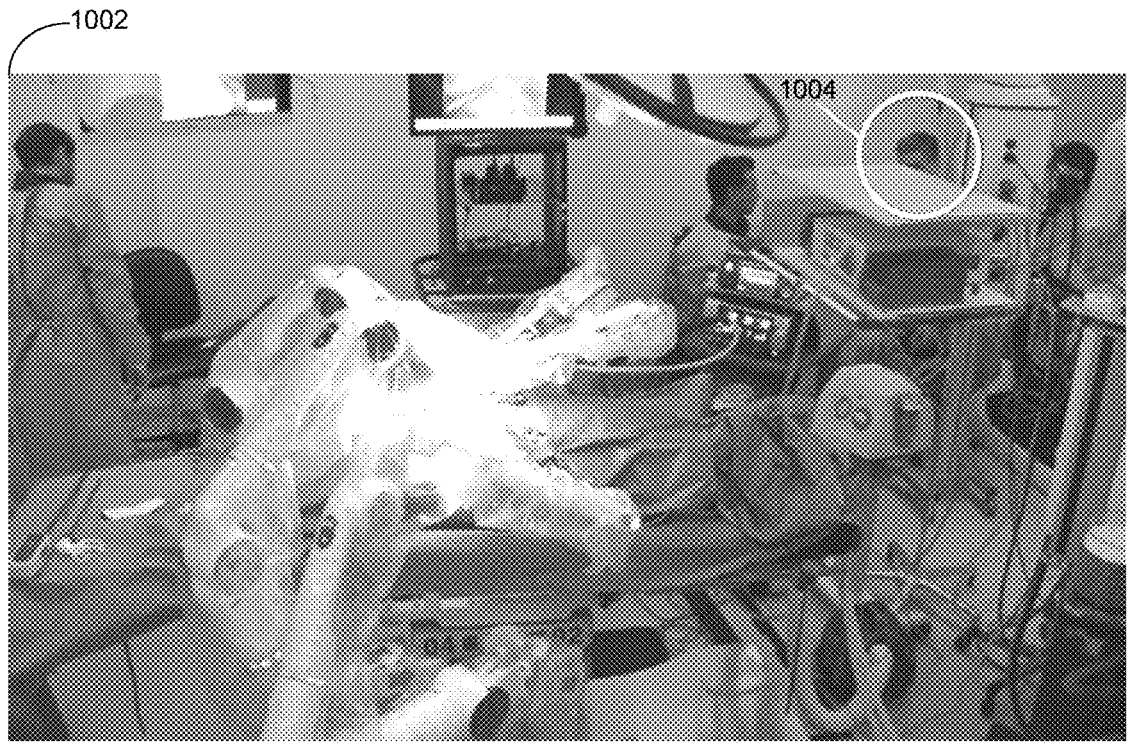
FIG. 10A shows an original/unprocessed OR video image containing an instance of a hard face that is severely occluded by OR objects in accordance with some embodiments described herein.
Figure 10B:
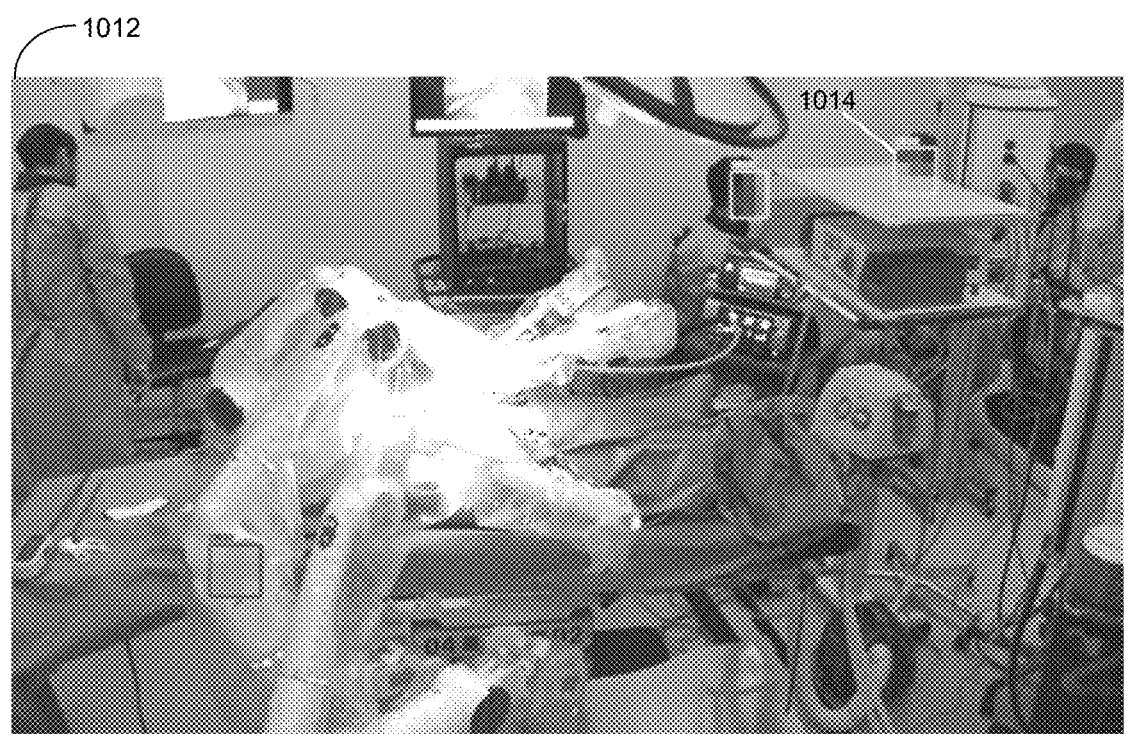
FIG. 10B shows a successfully de-identified OR video image after applying the disclosed face de-identification techniques to the original OR video image in FIG. 10A in accordance with some embodiments described herein.

FIG. 10A shows an original/unprocessed OR video image 1002 containing an instance of a hard face 1004 that is severely occluded by OR objects in accordance with some embodiments described herein. FIG. 10B shows a de-identified OR video image 1012 after applying the disclosed face de-identification techniques to the original OR video image in FIG. 10A in accordance with some embodiments described herein. As can be seen in FIG. 10B, hard face 1004 in FIG. 10A is detected (with a corresponding bounding box 1014) and de-identified along with a number of other successfully detected and de-identified hard faces.

Figure 11A:
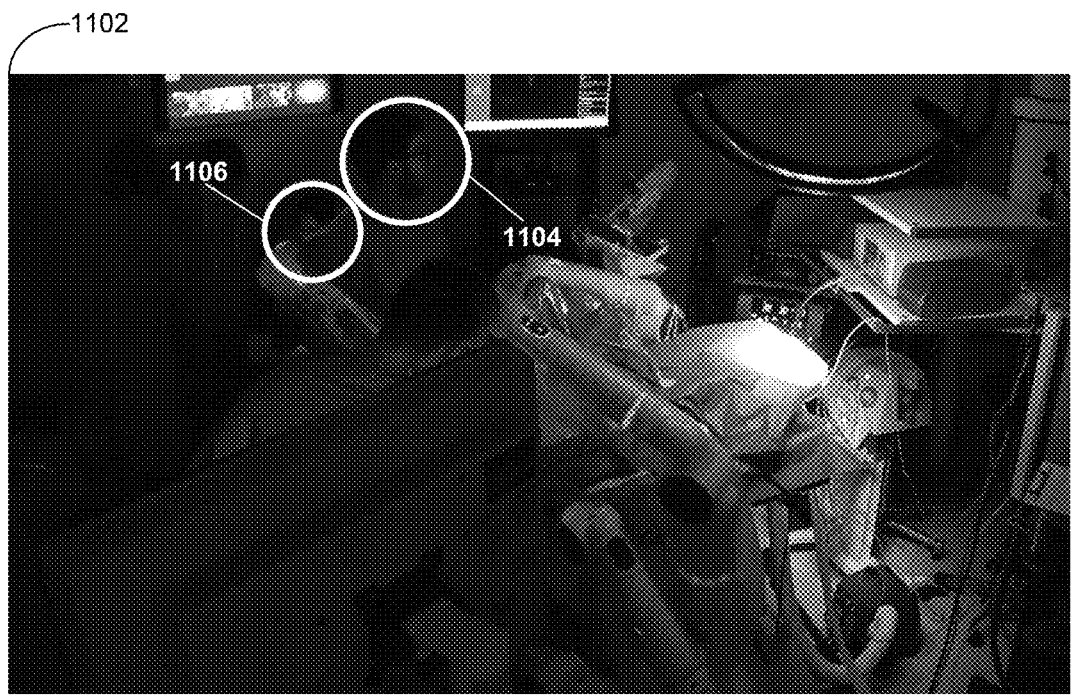
FIG. 11A shows an original/unprocessed OR video image containing multiple instances of hard faces that have weak illumination and/or with occlusion in accordance with some embodiments described herein.
Figure 11B:
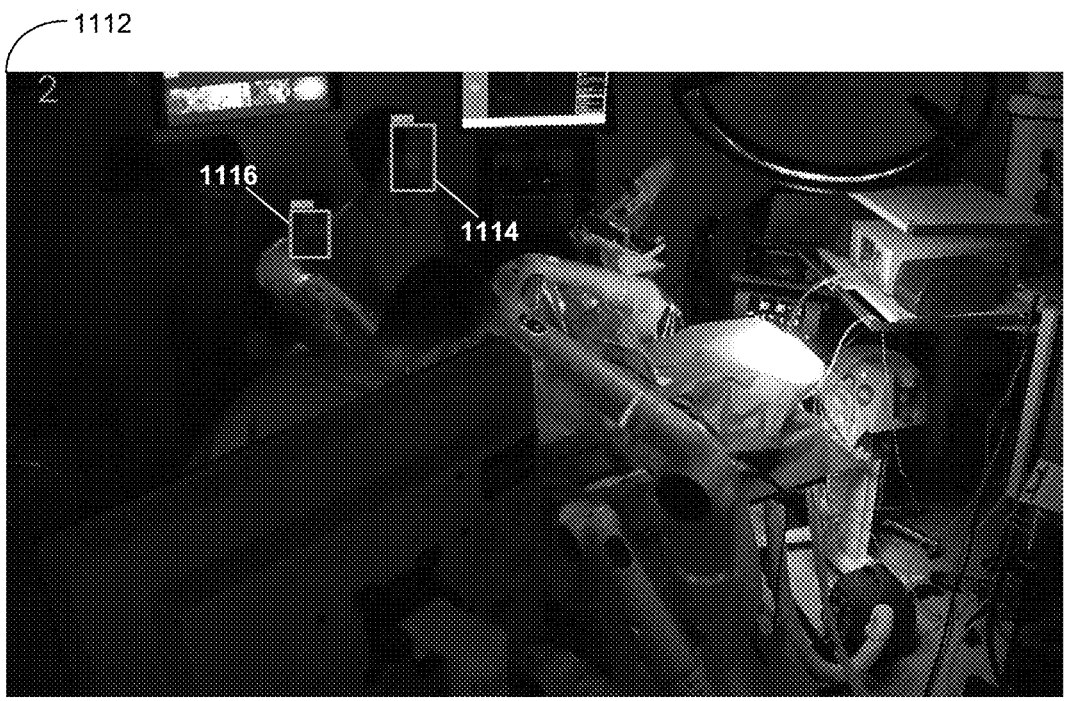
FIG. 11B shows a de-identified OR video image after applying the disclosed face de-identification techniques to the original OR video image in FIG. 11A in accordance with some embodiments described herein.

FIG. 11A shows an original/unprocessed OR video image 1002 containing multiple instances of hard faces 1104 and 1106 that have weak illumination and/or with occlusion in accordance with some embodiments described herein. FIG. 11B shows a de-identified OR video image 1112 after applying the disclosed face de-identification techniques to the original OR video image in FIG. 11A in accordance with some embodiments described herein. As can be seen in FIG. 11B, hard faces 1104 and 1106 in FIG. 11A are successfully detected (with corresponding bounding boxes 1114 and 1116) and de-identified.

Figure 12A:
FIG. 12A shows an original/unprocessed OR video image containing an instance of a hard face under strong illumination in accordance with some embodiments described herein.
Figure 12B:
FIG. 12B shows a de-identified OR video image after applying the disclosed face de-identification techniques to the original OR video image in FIG. 12A in accordance with some embodiments described herein.

FIG. 12A shows an original/unprocessed OR video image 1202 containing an instance of a hard face 1204 under strong illumination in accordance with some embodiments described herein. FIG. 12B shows a de-identified OR video image 1212 after applying the disclosed face de-identification techniques to the original OR video image in FIG. 12A in accordance with some embodiments described herein. As can be seen in FIG. 12B, hard face 1204 in FIG. 12A are successfully detected (with a corresponding bounding box 1214) and de-identified along with a number of other successfully detected and de-identified hard faces.

Note that while the disclosed people/face detection and de-identification systems and techniques of this disclosure have been described for the purposes of anonymizing or de-identifying OR videos, a person skilled in the art would appreciate that the disclosed people/face detection and de-identification systems and techniques can be applied to a much wider range of applications well beyond the OR videos. For example, the disclosed people/face detection and de-identification systems and techniques can be used to anonymize or de-identify other types of medical/health-related videos and images that are captured from hospital environments or from other non-hospital environments. The disclosed people/face detection and de-identification systems and techniques can also be used to detect and/or de-identify people/faces captured in other crowded non-medical environments such as public transportations and sporting events which generally contain many hard faces. Hence, the disclosed people/face detection and de-identification systems and techniques are not limited to the applications of de-identifying OR videos.

Figure 13:
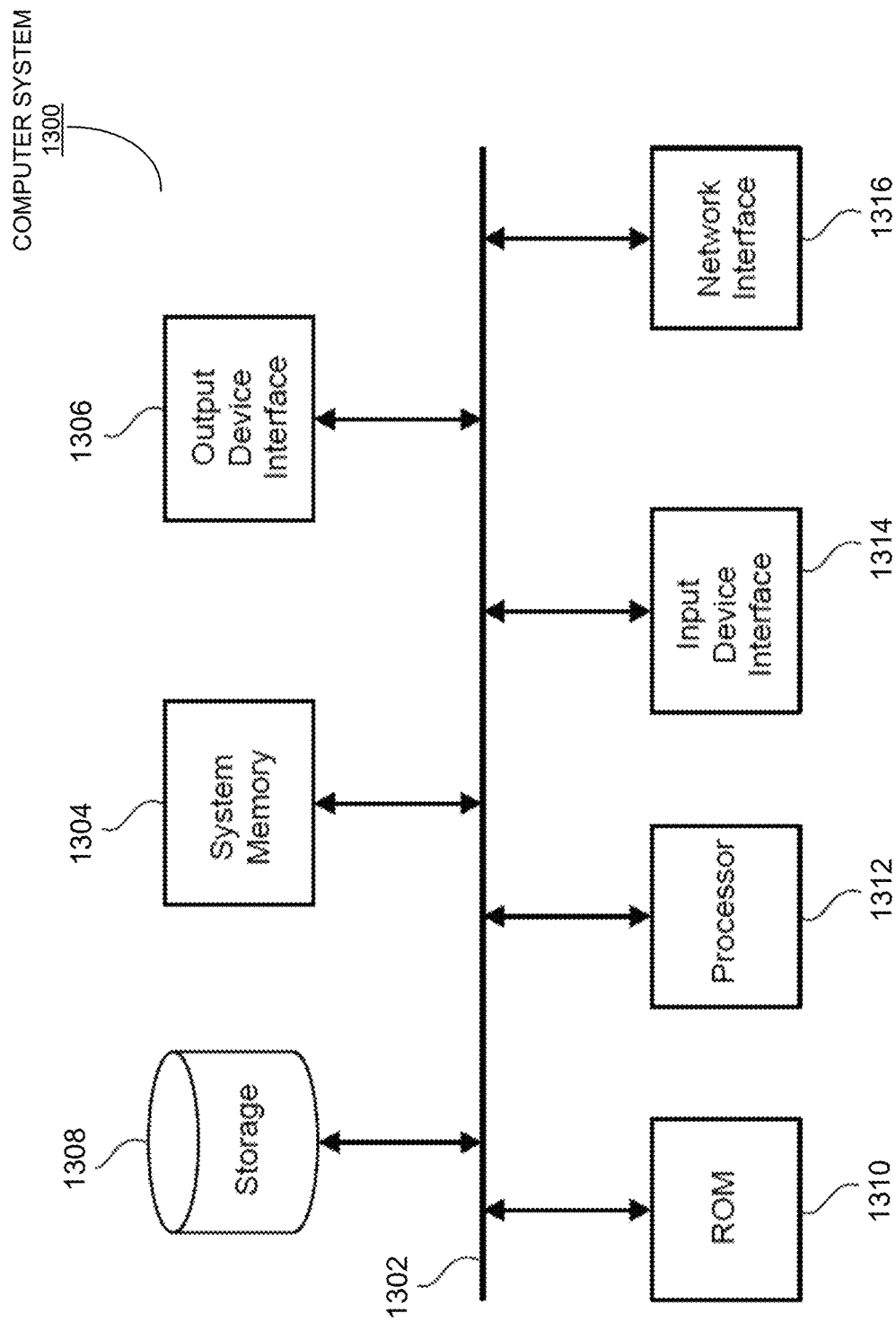
FIG. 13 conceptually illustrates a computer system with which some embodiments of the subject technology can be implemented.

FIG. 13 conceptually illustrates a computer system with which some embodiments of the subject technology can be implemented. Computer system 1300 can be a client, a server, a computer, a smartphone, a PDA, a laptop, or a tablet computer with one or more processors embedded therein or coupled thereto, or any other sort of computing device. Such a computer system includes various types of computer-readable media and interfaces for various other types of computer-readable media. Computer system 1300 includes a bus 1302, processing unit(s) 1312, a system memory 1304, a read-only memory (ROM) 1310, a permanent storage device 1308, an input device interface 1314, an output device interface 1306, and a network interface 1316. In some embodiments, computer system 1300 is a part of a robotic surgical system.

Bus 1302 collectively represents all system, peripheral, and chipset buses that communicatively connect the numerous internal devices of computer system 1300. For instance, bus 1302 communicatively connects processing unit(s) 1312 with ROM 1310, system memory 1304, and permanent storage device 1308.

From these various memory units, processing unit(s) 1312 retrieves instructions to execute and data to process in order to execute various processes described in this patent disclosure, including the above-described face-detection and face-tracking techniques for detecting and subsequently de-identifying human faces in the recorded OR videos described in conjunction with FIGS. 1-8. The processing unit(s) 1312 can include any type of processor, including, but not limited to, a microprocessor, a graphic processing unit (GPU), a tensor processing unit (TPU), an intelligent processor unit (IPU), a digital signal processor (DSP), a field-programmable gate array (FPGA), and an application-specific integrated circuit (ASIC). Processing unit(s) 1312 can be a single processor or a multi-core processor in different implementations.

ROM 1310 stores static data and instructions that are needed by processing unit(s) 1312 and other modules of the computer system. Permanent storage device 1308, on the other hand, is a read-and-write memory device. This device is a non-volatile memory unit that stores instructions and data even when computer system 1300 is off. Some implementations of the subject disclosure use a mass-storage device (such as a magnetic or optical disk and its corresponding disk drive) as permanent storage device 1308.

Other implementations use a removable storage device (such as a floppy disk, flash drive, and its corresponding disk drive) as permanent storage device 1308. Like permanent storage device 1308, system memory 1304 is a read-and-write memory device. However, unlike storage device 1308, system memory 1304 is a volatile read-and-write memory, such as a random access memory. System memory 1304 stores some of the instructions and data that the processor needs at runtime. In some implementations, various processes described in this patent disclosure, including the above-described face-detection and face-tracking techniques for detecting and subsequently de-identifying human faces in the recorded OR videos described in conjunction with FIGS. 1-8, are stored in system memory 1304, permanent storage device 1308, and/or ROM 1310. From these various memory units, processing unit(s) 1312 retrieves instructions to execute and data to process in order to execute the processes of some implementations.

Bus 1302 also connects to input and output device interfaces 1314 and 1306. Input device interface 1314 enables the user to communicate information to and select commands for the computer system. Input devices used with input device interface 1314 include, for example, alphanumeric keyboards and pointing devices (also called "cursor control devices"). Output device interface 1306 enables, for example, the display of images generated by the computer system 1300. Output devices used with output device interface 1306 include, for example, printers and display devices, such as cathode ray tubes (CRT) or liquid crystal displays (LCD). Some implementations include devices such as a touchscreen that functions as both input and output devices.

Finally, as shown in FIG. 13, bus 1302 also couples computer system 1300 to a network (not shown) through a network interface 1316. In this manner, the computer can be a part of a network of computers (such as a local area network ("LAN"), a wide area network ("WAN"), an intranet, or a network of networks, such as the Internet. Any or all components of computer system 1300 can be used in conjunction with the subject disclosure.

The various illustrative logical blocks, modules, circuits, and algorithm steps described in connection with the embodiments disclosed in this patent disclosure may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the aspects disclosed herein may be implemented or performed with a general purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, flash memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer-program product.

While this patent document contains many specifics, these should not be construed as limitations on the scope of any disclosed technology or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A computer-implemented method for de-identifying persons captured in an operating room (OR) video, the method comprising:
   receiving a sequence of video frames from an OR video;
   applying a first machine-learning face detector to each video frame in the sequence of video frames to generate a first processed sequence of video frames, wherein the first machine-learning face detector is configured to use a first deep-learning model to detect faces that lack one or more facial features;
   applying a second machine-learning face detector to each video frame of the sequence of video frames to generate a second processed sequence of video frames, wherein the second machine-learning face detector is constructed based on a second deep-learning model different from the first deep-learning model;
   combining a first set of detected faces in the first processed sequence of video frames and a second set of detected faces in the second processed sequence of video frames to generate a combined set of detected faces, wherein the first set of detected faces includes a first set of false negatives, the second set of detected faces includes a second set of false negatives that does not overlap with the first set of false negatives, and the combined set of detected faces includes a fewer number of false negatives than both the first set of detected faces and the second set of detected faces; and
   de-identifying the combined set of detected faces in the sequence of video frames to remove personal identifiable information (PII) from the sequence of video frames.

2. The computer-implemented method of claim 1, wherein the first machine-learning face detector is a top-down face detector configured to use contextual information outside the face of a person and from the body of a person to detect the face of the person.

3. The computer-implemented method of claim 1, wherein the second machine-learning face detector is a hybrid pose-keypoint face detector configured to detect the face of a person by:
   detecting two or more keypoints of the person, wherein each of the two or more keypoints can be either a face keypoint on the face of the person or a body keypoint on the body but outside of the face of the person;
   determining a position of the face based on the detected two or more keypoints;
   estimating a size of the face based on a distance between the detected two or more keypoints; and
   determining a bounding box for the face of the person based on the determined position and the estimated size of the face of the person.

4. The computer-implemented method of claim 1, wherein the first machine-learning face detector processes the sequence of video frames frame-by-frame without considering temporal relationships in consecutive frames in the sequence of video frames.

5. The computer-implemented method of claim 1, wherein the first processed sequence of video frames is composed of:
   a first subset of processed video frames, wherein a given video frame in the first subset is followed by a subsequent video frame in the first processed sequence of video frame, and wherein the subsequent video frame includes at least the same set of detected faces as the given video frame in the first subset; and
   a second subset of processed video frames, wherein a given video frame in the second subset is preceded by a previous video frame in the first processed sequence of video frames, and wherein the previous video frame includes one or more additional detected faces that are not detected in the given video frame in the second subset.

6. The computer-implemented method of claim 5, wherein prior to combining the first set of detected faces and the second set of detected faces, the method further comprises processing the first processed sequence of video frames using a third face detector to detect missing faces in the second subset of processed video frames.

7. The computer-implemented method of claim 6, wherein processing the first processed sequence of video frames using the third face detector includes processing a pair of consecutive video frames in the first processed sequence of video frames based on temporal information that indicates a degree of correlation between the pair of consecutive video frames.

8. The computer-implemented method of claim 7, wherein processing the pair of consecutive video frames using the third face detector includes:
   identifying a face that was detected in the first frame of the pair of consecutive video frames but subsequently missing in the second frame of the pair of consecutive video frames;
   instantiating an object tracker for the identified missing face; and
   locating the identified missing face in the second frame using the object tracker.

9. The computer-implemented method of claim 8, wherein instantiating the object tracker for the identified missing face further comprises:
   determining whether the detected face in the first frame is associated with a sufficiently low confidence level, wherein the object tracker is instantiated only if the detected face is determined to be associated with the sufficiently low confidence level.

10. The computer-implemented method of claim 8, wherein identifying the missing face in the second frame of the pair of consecutive video frames includes:
    computing a set of Intersection of Union (IoU) values for pairs of bounding boxes formed between each detected bounding box in the first frame and each bounding box in the second frame; and
    identifying a missing face in the second frame when all of the computed IoU values in the set of IoU values that are based on the same detected bounding box in the first frame are close to zero.

11. The computer-implemented method of claim 8, wherein the object tracker is implemented with a Channel and Spatial Reliability correlation Tracker (CSRT).

12. The computer-implemented method of claim 1, wherein the method further comprises performing OR personnel counting by:

for each video frame in the received sequence of video frames, counting a number of detected faces in the video frame based on the combined set of detected faces; and determining the number of people in the OR at any given time during a surgical procedure based on the number of detected faces in each video frame.

13. The computer-implemented method of claim 12, wherein the method further comprises keeping track of a rate of change of the number of people in the OR based on the determined numbers of people during the surgical procedure.

14. The computer-implemented method of claim 12, wherein the method further comprises determining a precise time when the current patient leaves the OR based on the determined numbers of people in the OR during the surgical procedure.

15. A system for de-identifying human in an operating room (OR) video, the system comprising:
one or more processors;
a memory coupled to the one or more processors, the memory storing instructions that, when executed by the one or more processors;
receive a sequence of video frames from the OR video;
apply a first machine-learning face detector to the sequence of video frames to generate a first processed sequence of video frames, wherein the first machine-learning face detector is configured to use a first deep-learning model to detect faces that lack one or more facial features;
apply a second machine-learning face detector to the sequence of video frames to generate a second processed sequence of video frames, wherein the second machine-learning face detector is constructed based on a second deep-learning model different from the first deep-learning model;
combine a first set of detected faces in the first processed sequence of video frames and a second set of detected faces in the second processed sequence of video frames to generate a combined set of detected faces, wherein the first set of detected faces includes a first set of false negatives, the second set of detected faces includes a second set of false negatives that does not overlap with the first set of false negatives, and the combined set of detected faces includes a fewer number of false negatives than both the first set of detected faces and the second set of detected faces; and
de-identify the combined set of detected faces to remove personal identifiable information (PII) from the received sequence of video frames.

16. The system of claim 15, wherein the memory further stores instructions that, when executed by the one or more processors, cause the system to further process the first processed sequence of video frames using a third face detector to detect missing faces in the first processed sequence of video frames by:
receiving a pair of consecutive video frames in the first processed sequence of video frames;
identifying a face that was detected in the first frame of the pair of consecutive video frames but subsequently missing in the second frame of the pair of consecutive video frames;
instantiating an object tracker for the identified missing face; and
locating the identified missing face in the second frame using the object tracker.

* * * * *